(12) United States Patent
Huggenberger

(10) Patent No.: US 11,325,239 B2
(45) Date of Patent: May 10, 2022

(54) HAND-HELD POWER TOOL

(71) Applicant: Festool GmbH, Wendlingen (DE)

(72) Inventor: Philipp Huggenberger, Munningen (DE)

(73) Assignee: FESTOOL GMBH, Wendlingen (DE)

( * ) Notice: Subject to any disclaimer, the term of this patent is extended or adjusted under 35 U.S.C. 154(b) by 261 days.

(21) Appl. No.: 16/642,271

(22) PCT Filed: Aug. 17, 2018

(86) PCT No.: PCT/EP2018/072318
§ 371 (c)(1),
(2) Date: Feb. 26, 2020

(87) PCT Pub. No.: WO2019/042792
PCT Pub. Date: Mar. 7, 2019

(65) Prior Publication Data
US 2021/0069885 A1   Mar. 11, 2021

(30) Foreign Application Priority Data

Aug. 29, 2017  (DE) .......................... 202017006789.7
May 16, 2018  (DE) .......................... 102018111792.2

(51) Int. Cl.
*B25F 5/00*   (2006.01)
*B23B 45/00*  (2006.01)

(52) U.S. Cl.
CPC ............ *B25F 5/001* (2013.01); *B23B 45/008* (2013.01); *B25D 2250/261* (2013.01)

(58) Field of Classification Search
CPC .......... B23B 45/008; B25F 5/02; B25F 5/001; B25D 2250/261
See application file for complete search history.

(56) References Cited

U.S. PATENT DOCUMENTS

| | | | |
|---|---|---|---|
| 2011/0180290 A1 | 7/2011 | Kondo | |
| 2018/0370011 A1* | 12/2018 | Bantle | ..................... B25F 5/001 |
| 2019/0160645 A1* | 5/2019 | Fukinuki | ............... B23B 45/008 |

FOREIGN PATENT DOCUMENTS

| | | |
|---|---|---|
| DE | 10222824 A1 | 4/2003 |
| DE | 102008056880 A1 | 5/2010 |

(Continued)

*Primary Examiner* — Anna K Kinsaul
*Assistant Examiner* — Daniel Jeremy Leeds
(74) *Attorney, Agent, or Firm* — Hoffmann & Baron, LLP

(57) ABSTRACT

A manual machine tool having a drive motor, a gearbox and a tool holder, wherein a motor output of the drive motor having a gearbox drive of the gearbox and a gearbox output of the gearbox are coupled to the tool holder in a manner which permits rotation, wherein the manual machine tool has an actuating device to adjust the gearbox between its switch positions, wherein the actuating device has an actuating part which is movably mounted between actuating positions relative to a machine housing of the manual machine tool and which can be manually actuated, which actuating part is coupled to the at least one switching gear element to set the switch positions. The actuating device has a locking arrangement with locking indentations arranged on a locking structure to lock the actuating part in the actuating positions, which locking indentations are assigned to actuating positions of the actuating part, and with a locking part to engage in the locking indentations.

24 Claims, 7 Drawing Sheets

(56) References Cited

FOREIGN PATENT DOCUMENTS

| EP | 0732715 | A1 | 9/1996 |
|---|---|---|---|
| EP | 1464427 | A2 | 10/2004 |
| EP | 2077177 | A1 | 7/2009 |
| EP | 2551063 | A1 | 1/2013 |
| EP | 2842697 | A1 | 3/2015 |

* cited by examiner

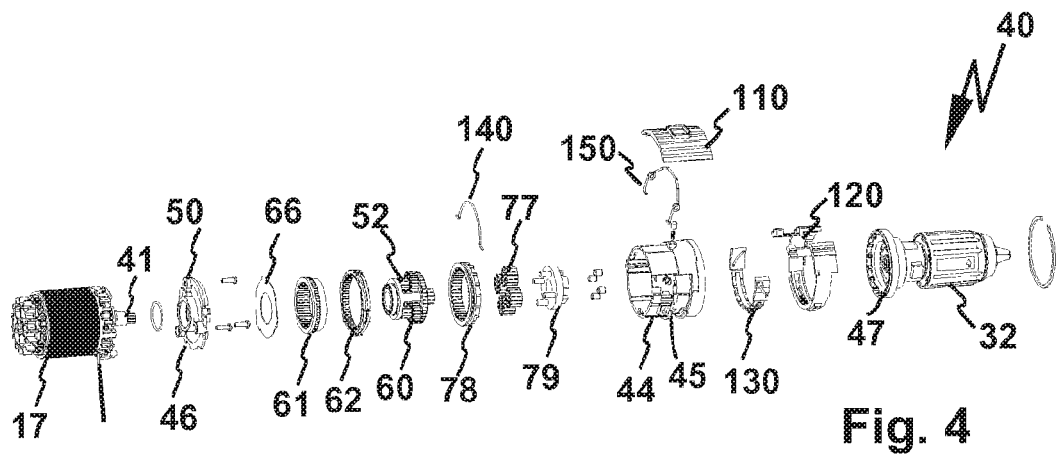
Fig. 4
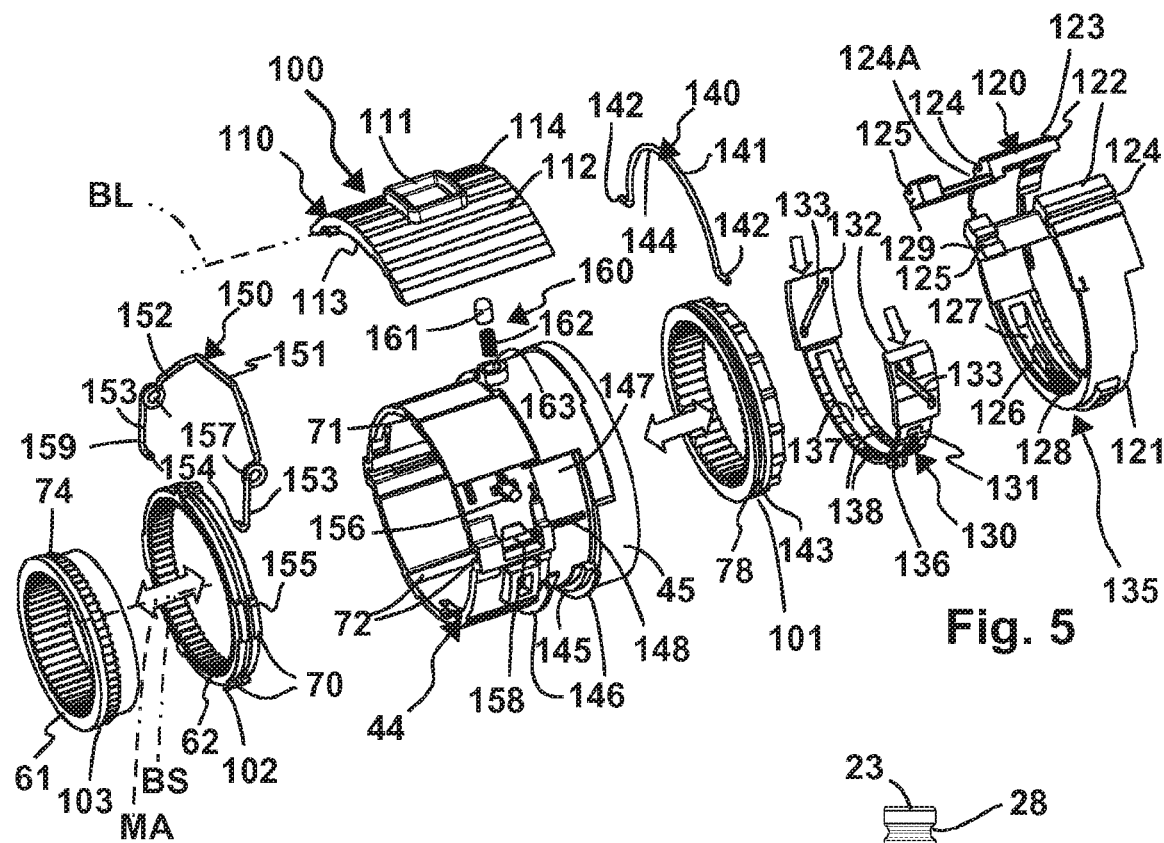
Fig. 5
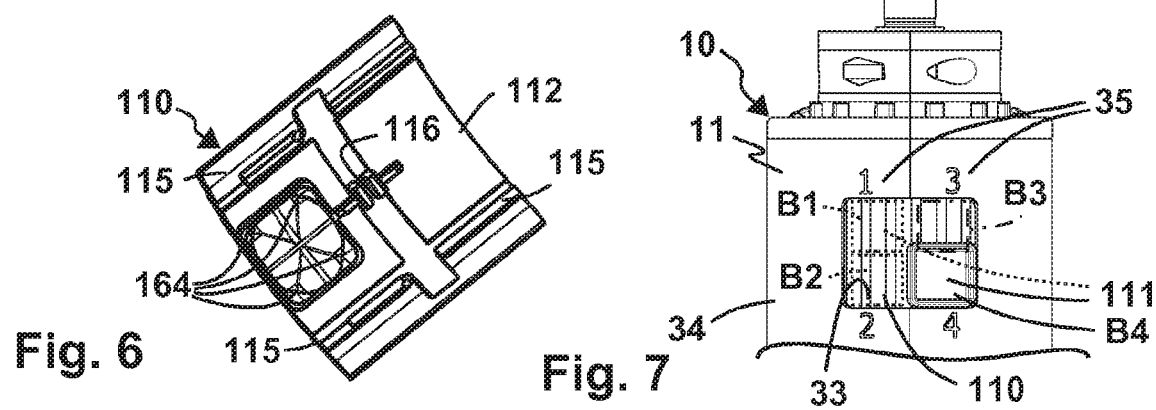
Fig. 6
Fig. 7

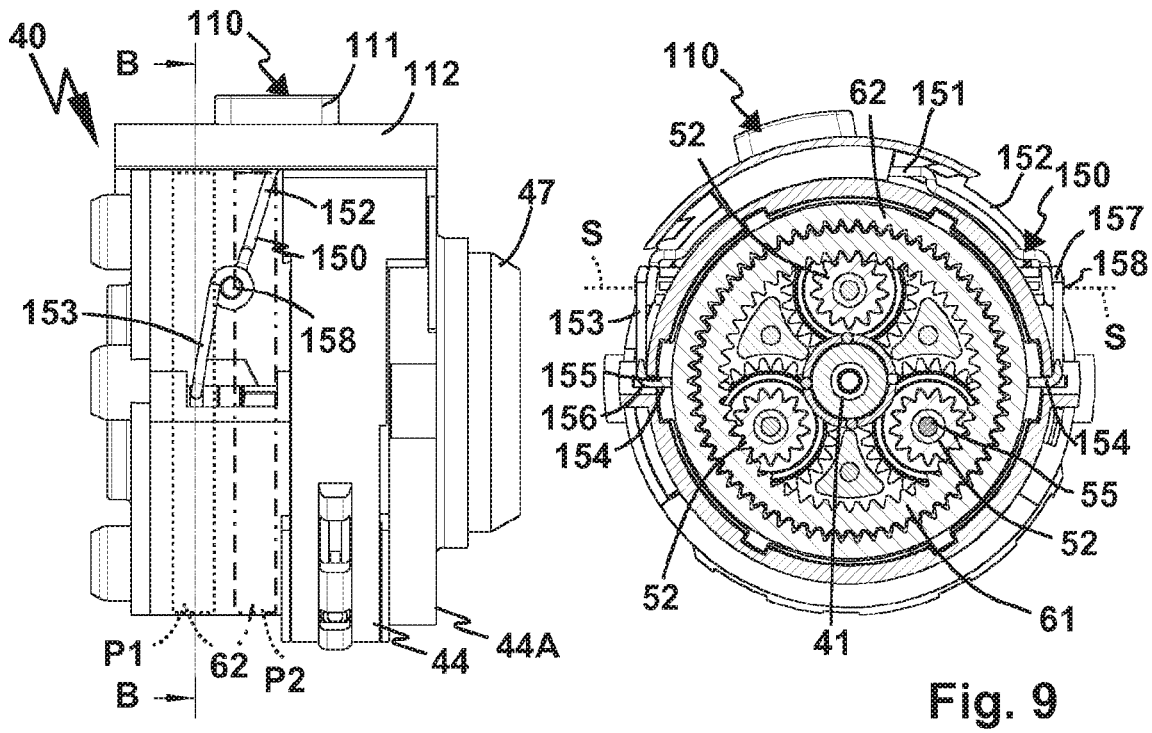
Fig. 8
Fig. 9
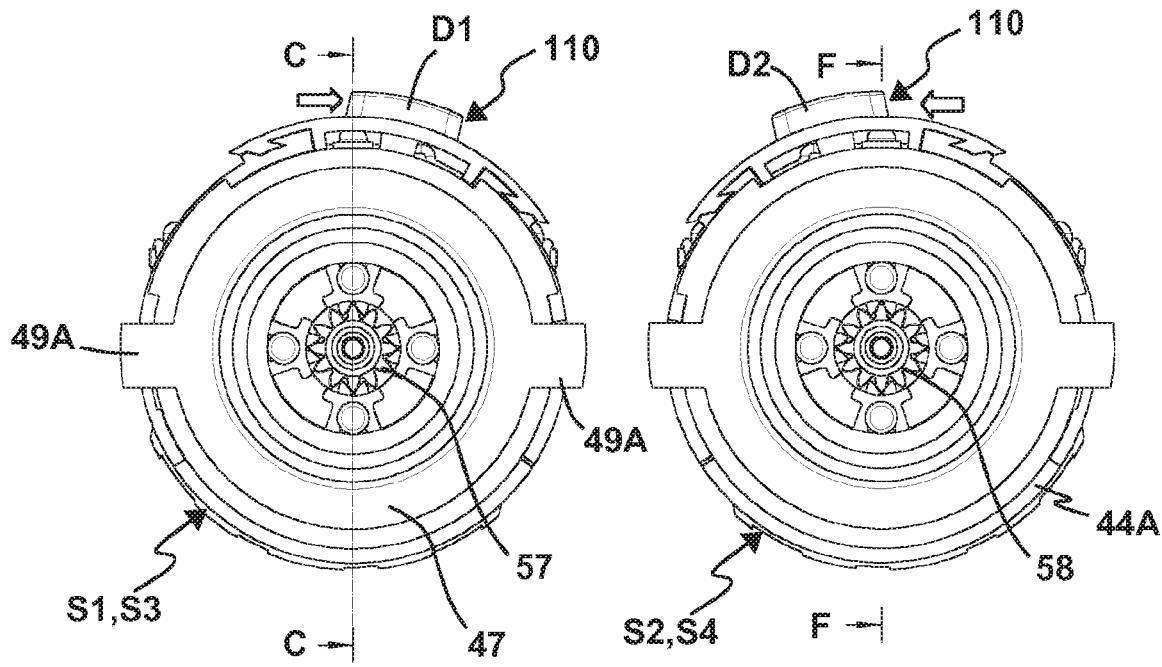
Fig. 10
Fig. 11

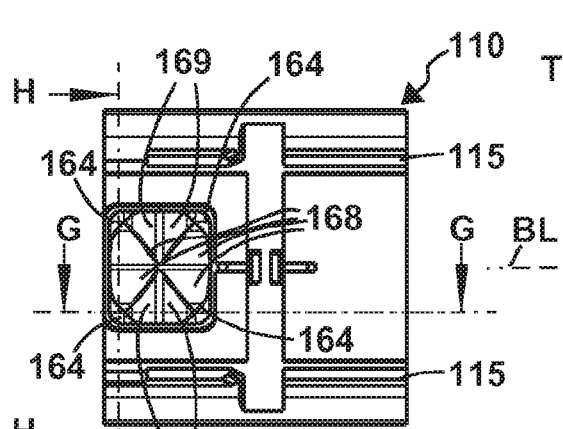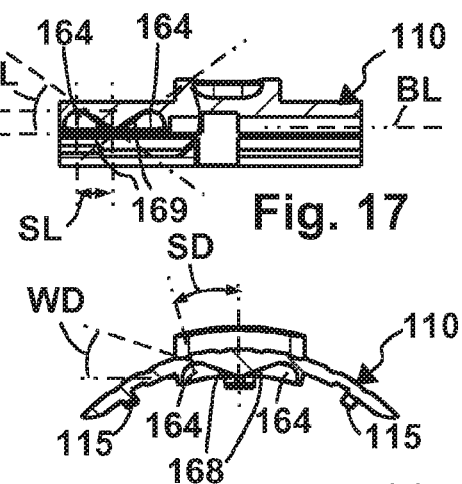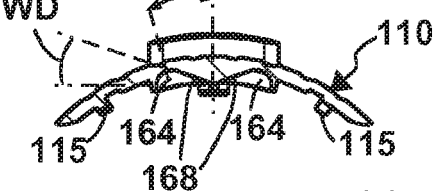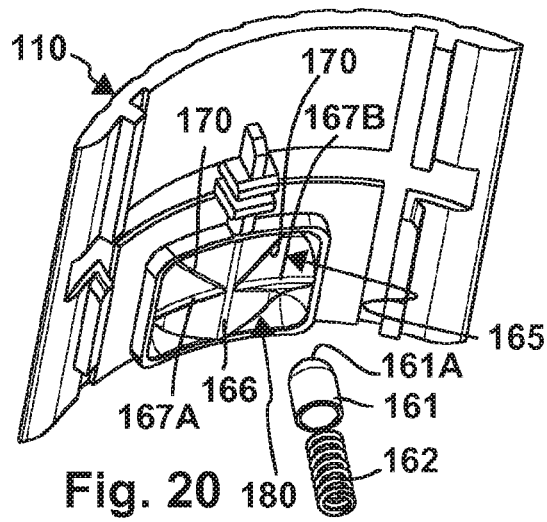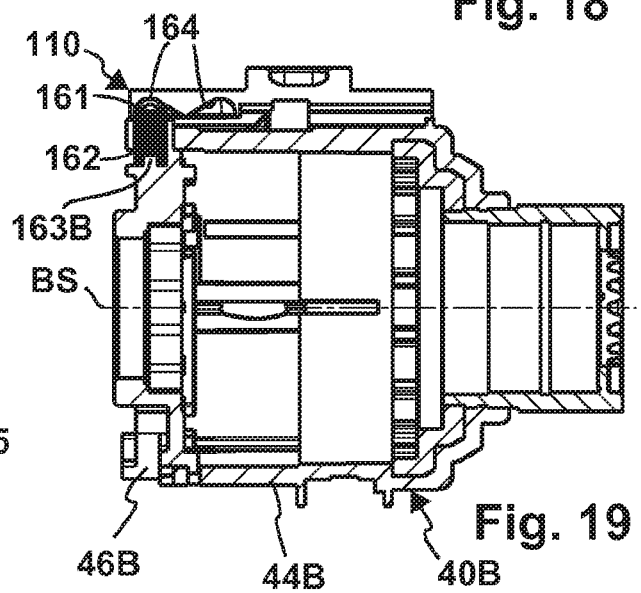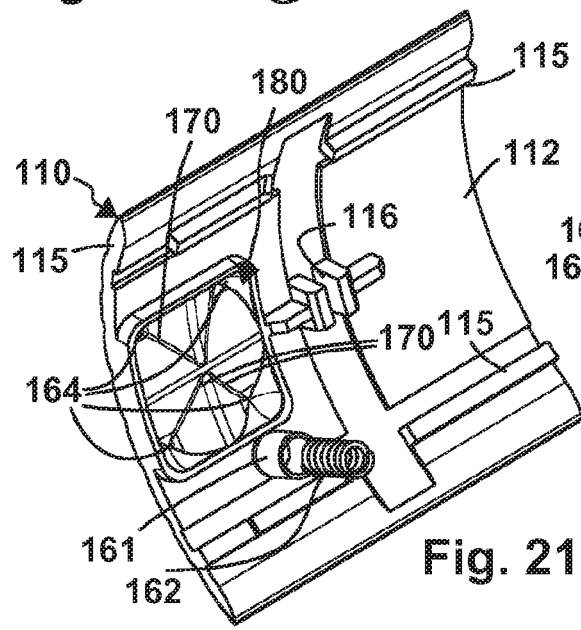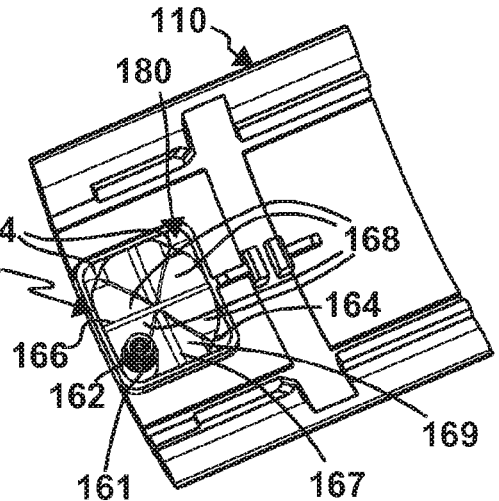

HAND-HELD POWER TOOL

This application claims priority based on an International Application filed under the Patent Cooperation Treaty, PCT/EP2018/072318, filed Aug. 17, 2018, which claims priority to DE 202017006789.7, filed Aug. 29, 2017 and to DE 102018111792.2, filed May 16, 2018.

BACKGROUND OF THE INVENTION

The invention relates to a manual machine tool having a drive motor, a gearbox and a tool holder, wherein a motor drive of the drive motor having a gearbox drive of the gearbox and a gearbox output of the gearbox which can be rotated about a rotational axis which are coupled to the tool holder in a manner which permits rotation, wherein the manual machine tool has an actuating device to adjust the gearbox between its switch positions in which speed ratios between the gearbox drive and the gearbox output are different, wherein the actuating device has an actuating part which can be manually actuated by an operated of the manual machine tool and is movably mounted relative to a machine housing of the manual machine tool between actuating positions assigned to the switch positions of the gearbox, which actuating part is coupled to the at least one switching gear element to set the switch positions, in particular by means of a coupling element.

A manual tool machine of this type is for example described in EP 1 886 769 A1. The manual machine tool has a four-speed gearbox in which switching gear elements in the form of hollow wheels are switched by means of an actuating device. The actuating device has actuating rings which are connected to setting elements by means of cam guides, which setting elements in turn actuate the hollow wheels and therefore the switching gear elements. The construction is complex. The operator must adjust the actuating parts into the respective final positions to reliably adjust the gearbox into its final switch positions.

SUMMARY OF THE INVENTION

The object of the present invention is therefore to provide a manual machine tool with an improved operating concept.

In order to achieve the object, in a manual machine tool of the type mentioned at the outset there is a provision for the actuating device to have a locking arrangement to lock the actuating part in the actuating positions with locking indentations arranged on a locking structure, which locking indentations are assigned to actuating positions on the actuating part, and for the locking structure to have a control surface arrangement with gliding surfaces along which the locking part can glide and which extend from at least two locking indentations to a vertex arranged between the locking indentations and protruding in front of the locking indentations, wherein the locking part has an unstable position on the vertex such that the locking part is guided past the vertex into one of the locking indentations adjacent to the vertex.

Several pairs of adjacent locking indentations can be provided, between which a vertex is arranged in each case.

The fundamental idea of this is that the locking part is guided as it were past the vertex in the direction of a locking indentation arranged adjacent to the vertex, in other words the locking part cannot remain on the vertex but instead takes on an unstable position on the vertex. The vertex is for example designed such that it prevents and/or is narrow to prevent the locking part from taking up a stable position on the vertex.

Starting from the vertex, the locking part advantageously reaches one of the locking indentations arranged adjacent to the vertex.

The locking arrangement enables an adjustment of the actuating part in the manner of a toggle that only takes on a stable position in defined end positions or switch positions.

The vertex can also be called a tilting contour, in particular a tilting line or a tilting point or an arrangement of tilting points. The locking part has an unstable position on the vertex or the tilting contour, in particular the tilting point or the arrangement of tilting points or the tilting line and tilts or automatically moves from the vertex or the tilting contour into one of the locking indentations arranged adjacent to the vertex.

In order to achieve the object, in a manual machine tool of the type mentioned at the outset in an alternative formulation, there is a provision for the actuating device to have a locking arrangement to lock the actuating part in the actuating positions with locking indentations arranged on a locking structure, which locking indentations are assigned to actuating positions on the actuating part, and for the locking structure to have a control surface arrangement with gliding surfaces along which the locking part can glide and which extend from at least two locking indentations to a vertex or a tilting contour arranged between the locking indentations and protruding in front of the locking indentations, wherein the locking part has an unstable position on the vertex or the tilting contour such that the locking part is guided past the vertex or the tilting contour into one of the locking indentations adjacent to the vertex or the tilting contour.

The locking part is advantageously guided past the vertex or the tilting contour automatically and/or automatically and/or without operation and/or by means of a spring force acting on the locking part into one of the locking indentations adjacent to the vertex or the tilting contour.

The vertex or the tilting contour is preferably a narrow line or designed as a narrow line or line-shaped.

A single vertex or a single tilting contour is preferably provided or arranged between two adjacent locking indentations.

The vertex or tilting contour is preferably designed as a type of burr and/or ridge and/or edge or formed by these. Only a single burr or vertex or ridge of this kind or a single edge of this kind is preferably provided between two locking indentations.

Two gliding surfaces with an inclination and/or with slopes in the direction of the locking indentation arranged on the respective gliding surface advantageously extend from the vertex in each case.

The gliding surfaces run to the vertex and intersect in the region of the vertex.

The actuating part can therefore be locked in a respective switch position, for example in the respective longitudinal positions, in particular longitudinal end positions, relative to an actuating longitudinal axis and/or a pivot position relative to an actuating pivot axis of the actuating part.

The locking part is preferably sprung or elastic.

For example, a separate spring, in particular a coil spring, is provided to spring load the locking part. It is also possible, however, for the locking part to be arranged on a spring arm or to have a spring arm, which in turn is arranged on a component which is locally fixed, for example a component which is locally fixed relative to the machine housing or the actuating part.

The locking structure is preferably fixed to prevent movement relative to the actuating part. The locking structure is preferably arranged on the actuating part.

It is advantageous if the control surface arrangement according to the invention extends between the respective locking indentations or all locking indentations of a locking arrangement or locking structure such that the locking part is as it were guided into one of the locking indentations by force and takes on an unstable position on the vertices of the control surface arrangement.

The vertex is preferably straight or arch-shaped in full or in sections. It is understood that the vertex can overall be straight or overall be arch-shaped between two locking indentations or can also have arch-shaped or straight sections. A respective gliding surface extends from the locking indentation to the assigned vertex along the entire length of this.

The locking structure can have more than two locking indentations, for example three or four locking indentations. It is possible for a vertex to only be provided between two locking indentations of this type, on which vertex the locking part takes on an unstable position. It is preferable, however, for a vertex to be provided between several pairs or each pair of two locking indentations, on which vertex the locking part takes on an unstable position, such that it is guided into the locking indentation arranged adjacent to the respective vertex. Consequently, a preferred embodiment provides for the locking structures to have at least two or three locking indentations, between which a vertex is arranged in each case, on which vertex the locking part has an unstable position and from which vertex a gliding surface extends out to the respective locking indentation in each case. If for example three locking indentations are provided, a total of three vertices are provided, with two gliding surfaces extending from each to an assigned locking indentation in each case.

It is preferable for the vertices to run in a star-shaped manner or to cross over one another or both. For example, a central vertex point can be provided at which the vertices cross or from which the vertices run in a star-shaped manner and on which the locking part has an unstable position. For example, an arrangement in the manner of a mountain peak with side valleys extending away from the mountain peak is provided in which the locking part is guided in each case when it is unstable on the peak of the mountain or on ridges which extend away from the peak or the vertex point.

The locking recesses expediently have the same angular distances from one another. Of course angular distances that are different from one another are also possible. In particular, the angular distances between the locking indentations correspond to the actuating positions of the actuating part.

It is preferable for the locking indentations to be arranged in corner areas of a polygon. The polygon preferably has equal sides. There can, for example, be a provision for the locking indentations to be arranged in the respective corner areas of a square or a rectangle. Locking indentations can, however, also be arranged in corner areas of triangles or pentagons or the like, between which vertices then extend on which the locking part has an unstable position.

Gliding surfaces which face one another are assigned to at least one of the locking indentations, between which gliding surfaces a depression or channel is formed which extends from the locking indentation to the vertex. The depressions or channels can extend up to a crossing point or star point of two or more vertices. An inner radius of the depression or channel is preferably smaller than an outer radius of a gliding surface of the locking part provided to guide along the locking structure. For example, the depression or channel forms a guide, in particular a linear guide, which guides the locking part in the direction of the assigned locking indentation.

The gliding surfaces which face one another are for example aligned in an approximately V shape.

The locking structure or the control surface arrangement preferably has the shape of a pyramid, for example a three-sided or four-sided pyramid, wherein depressions or channels are arranged on the side surfaces which extend towards the top of the pyramid and each extend to a respective locking indentation. The base of the pyramid can for example have the outer circumference of a triangle, square, pentagon or other polygon.

A construction in which the locking part is actively actuated by an operator in the direction of the vertex is possible.

It is preferred, however, for at least one of the gliding surfaces to be a sloped surface and/or a surface which is convex relative to the locking part. A combination of sloped surface and convex surface is easily possible. A convex surface can have equal or unequal radii. The locking part is guided in the direction of the locking indentation or in the direction of a depression or channel between gliding surfaces which face one another by the sloped surface or convex surface.

At least one of the gliding surface has an incline of at least 12 degrees from the vertex to the locking indentation adjacent to the vertex. The incline is preferably steeper, for example 15 degrees or 20 degrees. It is particularly preferable for the incline to be at least 25 degrees or 30 degrees. A correspondingly stronger actuating force in the direction of the locking indentation is achieved by a relatively steep incline or a steep angle of inclination of the gliding surface. Consequently, the actuating part can be spring loaded in the direction of one of the actuating positions with greater force.

The locking structure preferably has several gliding surfaces, one of which gliding surfaces has a twisting of the locking structure and the locking part relative to one another and the other of which gliding structures has a linear arrangement of the locking structure and the locking part relative to one another.

A gliding surface along which the locking part glides in the event of a relative twisting of the locking structure and the locking part expediently has a more gentle incline or a more gentle angle of inclination than a gliding surface along which the locking part glides in the event of a linear arrangement of the locking structures of the locking part relative to one another. A rotational movement is generally easier than a sliding movement. As a result of the steep incline or the steep angle of inclination of the gliding surface assigned to the linear arrangement of locking structure and locking part, a sufficiently large actuating force is exerted on the actuating element in the direction of the actuating position assigned to the linear arrangement even in the case of a linear arrangement.

The locking part can for example have a gliding surface that runs to a peak in order to glide along the locking structure. It is preferable, however, for the locking part to have a convex and/or spherical gliding surface to glide along the locking structure. The spherical or convex gliding surface glides particularly easily along the locking structure. A convex or spherical gliding surface is particularly unstable in the region of the vertex or vertices.

In order to improve the gliding properties of the locking part, the gliding surface of this can have a gliding coating, for example made of polytetrafluoroethylene, a ceramics material or the like.

It is advantageous if the locking part is spring loaded in the direction of the locking indentations or in the direction of a locking position which engages in the locking indentations.

For example, the locking part can be arranged on a spring arm or can have a spring arm.

The locking part is preferably spring loaded by means of a spring arrangement or a spring in the direction of the locking indentations, in particular a locking spring, a leaf spring or the like.

The locking part is advantageously guided into one of the locking indentations adjacent to the vertex due to the unstable position on the vertex as a result of the spring loading, in particular the spring loading of the at least one spring or a spring arrangement. The locking part glides along the gliding surfaces in the direction of one of the locking indentations in each case starting from the vertex as a result of the spring loading.

The fact that the locking structure or control surface arrangement has a lower friction coefficient in the region of at least one vertex, preferably in the region of all the vertices, than on a surface extending away from the vertex, for example one of the gliding surfaces and/or in the region of the locking indentations can also contribute to the possible unstable position of the locking part in the region of the vertex or the vertices. The friction coefficient can be lower in the region of the locking indentations than in the region of the vertex running adjacent to the locking indentation or the vertices running adjacent to the locking indentation. However, with respect to the gliding surfaces it is also advantageous if they have a lower friction coefficient, or in any case a lower friction coefficient than a respective locking indentation adjacent to which the gliding surface runs or to which the gliding surface is assigned.

The friction properties in the region of the at least one vertex can for example be achieved by means of a gliding coating on a base body of the locking structure, for example by means of polytetrafluoroethylene, ceramics material or another material with a low level of friction of the like.

It is also possible for composite materials, for example, to be used for the locking structure or control surface arrangement. Sections of a material component of the composite material with lower levels of friction can be provided in the region of the vertex or the protruding sections of the locking structure or control surface arrangement while adjacent to these sections another material component of the composite material with a higher level of friction than in the region of the at least one vertex is provided.

The locking structure and the locking part can for example have pairs of materials which glide well relative to one another, for example steel and steel sprayed with plastic or pairs of plastic and metal. Furthermore, the surfaces of the locking structure and locking part which glide along one another can comprise different metals, in particular pairs of steel and bronze or steel and grey cast iron.

It is further advantageous if the locking part and/or the locking structure comprises polyimide, polyamide or polyoxymethylene (POM) in the region of the surfaces that glide along one another.

The locking arrangement is preferably arranged in a hidden manner. The locking arrangement is preferably arranged on a lower side of the actuating part and/or between the actuating part and the gearbox housing, in particular a cover of the gearbox housing.

The locking part is preferably supported and/or movably mounted on the gearbox housing or the cover of this. The locking structure is preferably arranged on the actuating part, for example on the inner side or lower side which faces the gearbox or gearbox housing.

The locking part can, however, also be arranged on the actuating part which is movable relative to the machine housing. The locking structure is then fixed in a location relative to the machine housing or gearbox housing.

Two or more locking recesses can be provided on the locking structure in which locking recesses the locking part is arranged.

An actuating handle is preferably arranged on the actuating part for manual actuation. The actuating part can also, however, be coupled to an actuating handle which can be manually actuated in a manner which enables movement or connected to it in a fixed manner.

It is understood that several switching gear elements which can be actuated or switched by the actuating device and/or several coupling elements to couple a respective switching gear element to the actuating device can be provided.

It is preferable for a switching gear element to be coupled to the actuating part by means of a coupling element. It is also possible for a switching gear element to form a coupling element to couple a further switching gear element to the actuating part or the actuating device.

The coupling element assigned to a switching gear element can form a part of the switching gear element or be connected to the switching gear element in a fixed manner.

It is preferable for the coupling element assigned to the switching gear element to be movable relative to the switching gear element, for example able to be slid and/or pivoted.

The actuating part is expediently pivotably mounted relative to the machine housing of the manual machine tool about an actuating pivot axis and/or displaceably mounted about a linear actuating longitudinal axis. It is possible that the abilities to move, namely the ability to pivot and the ability to adjust in a linear manner enable the actuating part to make overlapping movements. It is further possible that the actuating part has just one degree of freedom of movement when pivoting or several degrees of freedom of movement when pivoting. The actuating part can also have just one degree of linear freedom of movement or several, for example two, degrees of linear freedom of movement.

The actuating part can be mounted on the machine housing or on the gearbox housing along the actuating linear axis in a manner which enable linear displacement and/or in a manner which enables pivoting about an actuating pivot axis.

A spring arrangement is expediently arranged between the actuating part and the at least one switching gear element. It is preferable for a spring arrangement or a part of this to be arranged between each switching gear element and the actuating part. The spring arrangement places a load on the switching gear element in its respective setting position or a setting position assigned to the position of the actuating part during and/or after an actuation of the actuating part. If the switching gear element cannot reach its setting position, for example because its teeth are not aligned with the teeth of a gear wheel that works with the switching gear element, the spring loading ensures that in the event of a relative rotational adjustment of the switching gear element and gear wheel, the two components can mesh together in a positive-locking manner.

At least one coupling element can be provided to supply at least part of the spring arrangement or the spring arrangement as a whole.

The coupling element expediently comprises a spring bow or is formed by a spring bow. The spring box expediently extends in a ring-shaped manner around the respective switching gear element. The spring bow can for example have bow arms, which are elastic and flexible. The longitudinal ends of the spring bow expediently engage in corresponding recesses, for example bores, grooves, guides, in particular longitudinal guides or the like, on the respective switching gear element.

There is preferably a provision for the switching gear element to have a first switching gear element and a second switching gear element, which can be adjusted between a first setting position and a second setting position in each case in a linear manner relative to a gearbox housing using the actuating device. It is possible for the respective switching gear element to be able to be adjusted in a linear manner by means of a linear adjustment of the actuating part.

A deflection of a movement of the actuating part into a movement of the respective switching gear element is, however, also easily possible. There can advantageously be a provision for the first switching element to be able to be adjusted by a pivoting movement of the actuating part about the actuating pivot axis in a linear manner along its setting axis by means of a deflecting gear.

An advantageous embodiment provides for the deflecting gear to comprise a carrier ring which extends in a ring-shaped manner around the gearbox housing and is mounted such that it is rotatable about the actuating pivot axis, which carrier ring is coupled to the first switching gear element by means of a first coupling element to enable the linear adjustment of this.

It is preferably if the actuating part is displaceably mounted on the carrier ring in a linear manner along an actuating longitudinal axis and coupled to the at least second switching gear element using a second coupling element to achieve linear displacement of the second switching gear element. The fundamental idea of this is that in principle the carrier ring forms a rotating body or a pivot bearing for the actuating part. The actuating part can therefore pivot about the gearbox housing with the carrier ring in order to switch the first switching gear element. In turn, the actuating part is displaceably mounted in a linear manner on this carrier ring, such that it can carry out the linear movement to adjust the second switching gear element directly. A further slide or support for the actuating part or the second coupling element is not necessary. It is also possible in this arrangement to carry out the two actuating movements, namely about the actuating longitudinal axis and actuating pivot axis, which can occur in parallel to one another, in an overlaid manner such that the first switching gear element and the second witching gear element can be switched simultaneously and the gearbox can be switched for example from a first switch position or a first gear directly into a third gear or a third switch position without the second or an intermediate switch position or a gear arranged in between needing to be controlled.

A spring arrangement is expediently arranged between the actuating part and the first switching gear element or the second switching gear element or both. The spring arrangement between the second switching gear element and the actuating part can in particular be provided by the second coupling element, for example exclusively by the second coupling element. It is also possible, however, for a spring or spring arrangement which is separate to this to be provided. A spring arrangement and the elastic coupling element can also be provided. The spring arrangement can however easily be provided between the first switching gear element and the actuating part by the first coupling element.

The first coupling element or the second coupling element or both can for example comprise or be a spring element. In particular, a spring bow or the like is suitable as an elastic, flexible coupling element.

A preferred and simple embodiment provides for the actuating part to be coupled to the second switching gear element exclusively by means of the second coupling element or by means of a single component. Consequently no further component is necessary between the switching gear element and the actuating part. In particular, the spring bow which has already been mentioned is suitable as a second coupling element and extends as a single component to make the connection between the actuating part and the second switching gear element.

A for example ring-shaped, rod-shaped or otherwise similarly designed transmission part is arranged between the carrier ring and the first coupling element, which transmission part can be moved about the actuating pivot axis together with the carrier ring. The transmission part and the carrier ring can be moved relative to one another, for example they are rotatable and/or displaceable relative to one another. A spring arrangement is arranged between the transmission part and the carrier ring which can be actuating by means of a relative movement of the transmission part and the carrier ring in order to achieve spring-loading of the first setting gear element in at least one switch position. Consequently, the carrier ring can reach a final rotation position while the transmission part has not yet reached this final position and is spring-loaded in the final position by the spring element or the spring arrangement. If the first setting gear element has a suitable position with respect to a component to be switched, for example a gear wheel, it is pushed or adjusted into this final position by the spring arrangement.

At least one guide cam is expediently arranged on the carrier ring or a transmission part that can be moved together with the carrier ring about the actuating pivot axis, for example the above-mentioned protruding part which can be adjusted relative to the carrier ring in order to deflect the movement of the actuating part about the actuating pivot axis into a linear movement of the first setting gear element. The first coupling element or a body associated with this or coupled to this engaged with the guide cam. Two guide cams are preferably provided which are arranged on opposite sides of the gearbox housing or the gearbox holding structure.

The second coupling element is expediently pivotably and/or displaceably mounted relative to the gearbox housing. Consequently it is possible for the second coupling element, which is adjusted in a linear manner, to transfer the linear movement to the second setting gear element on the basis of a displacement relative to the gearbox housing. However, a pivot bearing or a combined pivot and thrust bearing of the second coupling element is also possible.

The second coupling element is expediently pivotably mounted on a pivot bearing provided on a gearbox housing, for example a bearing pin which protrudes from the circumference wall of the gearbox housing or a bearing recess arranged in the circumference wall of the gearbox housing. The second coupling element can also alternatively or additionally be pivotably mounted on the actuating part. The bearing recess can for example be achieved by a longitudinal groove. This longitudinal groove can also be the arch-shaped guide recess described below. If bearing pins or bearing recesses are provided on the gearbox housing, these are expediently provided on opposite sides of the gearbox housing and/or on an area of the gearbox housing which is largest in size. Consequently, the bearing pins protrude for example in a radial direction in front of the circumference wall of the gearbox housing.

The actuating part expediently has a guide recess which extends in an arch shape about the actuating pivot axis and engages in the one coupling element, for example the second coupling element. In particular, the coupling element has a straight or curved section which engages in the above-mentioned guide recess. It is possible for the guide recess to be of a sufficient depth for an arch-shaped moving space to be present in which the second coupling element can engage when it pivots about the actuating pivot axis.

The actuating part is expediently displaceably mounted in a linear manner on a linear guide of the carrier ring. Consequently, the carrier ring has a linear guide with one or more guide grooves or other linear guide elements of the like. Linear guide projections can also be provided, for example longitudinal ribs or the like, which stick out from the carrier ring and engage in corresponding longitudinal guide grooves on the actuating part. Consequently, linear guide components are present on the carrier ring and on the actuating part.

Advantageously there is a provision for the actuating part to be guided on a machine housing of the manual machine tool. For example, a wall of the machine tool has a slot or recess in which the actuating part is arranged. Guide recesses, in particular guide grooves, pockets or the like can be provided on one or more edge areas of the recess to guide the actuating part.

The coupling element, in the above embodiment for example the second coupling element, expediently engages in a slot of the linear guide. For example, the linear guide has linear guide sections, between which the slot is arranged. The linear guide sections are expediently connected by means of connection sections. The second coupling element engages between the connection sections and the actuating part.

The linear guide expediently comprises two linear guide sections arranged at an angular distance from one another relative to the actuating pivot axis.

Consequently, the actuating part can be guided on two or more linear guide sections, which can also be interrupted, for example by the above-mentioned slot.

The actuating part expediently has at least one support section to support the gearbox housing. Consequently the actuating part is supported on one side by the carrier ring and on the other side on the gearbox housing.

It is preferable for the actuating part to have an arch-shaped or barrel-shaped wall design. Consequently, it is advantageous for the actuating part to cover the components and/or the locking arrangement to be actuated by it.

An embodiment can provide for the actuating part to connect longitudinal end areas of the carrier ring that are at a distance from one another to one another.

The carrier ring has a distance between its longitudinal end areas that is bridged by the actuating part. For example, the actuating part engages in linear guide sections arranged on the longitudinal end area such that these linear guide sections are connected to one another relative to the actuating pivot axis. The actuating part therefore closes the carrier ring as it were.

At this point it should be noted that the carrier ring can be a closed ring, in other words it fully surrounds the gearbox housing. It is also possible, however, for the carrier ring to only be a partial ring. Consequently, the carrier ring can be designed as a ring segment. The carrier ring preferably extends around at least half of the outer circumference area of the gearbox housing, in other words around at least 180 degrees. It is preferable for the carrier ring to extend around at least 270 to 300 degrees of the outer circumference of the gearbox housing.

The gearbox can be switched between at least two switch positions in which speed ratios between the gearbox drive and the gearbox output are different from one another. It is advantageous in this case for the gearbox to comprise a first gear wheel arrangement and at least a second gear wheel arrangement, each of which has at least one gear wheel and a switching gear element. The switching gear elements and the gear wheels of the gear wheel arrangement are preferably toothed wheels. Of course, the invention can also be used in a rolling wheel drive or friction wheel drive.

A respective switching element is preferably mounted in a locally adjustable manner to set the switch positions of the gearbox on the or a gearbox holding structure, for example the gearbox housing, between at least two setting positions and/or can be adjusted between an unmovable and a movable position relative to the gearbox holding structure.

The switching gear element of the first gear wheel arrangement advantageously forms a switch actuator for the second gear wheel arrangement to switch the gearbox between two of the switch positions, which switching gear element can be switched between a first setting position and at least a second setting position in which a movement of the switching gear element of the second gear wheel arrangement is different relative to the gearbox holding structure and/or the switch actuator is disengaged and engaged with the at least one gear wheel of the second gear wheel arrangement.

The switch actuator can be directly engaged with one or more gear wheels of the second gear wheel arrangement, for example a planetary gear set with the second gear arrangement is tightly coupled to or engaged with the first gear arrangement, which forms or comprises the at least one gear wheel of the first gear wheel arrangements. The planetary gear sets can no longer be rotated relative to one another and are coupled to one another such that they cannot rotate by means of the switching gear element, for example a hollow wheel.

In this embodiment of the gearbox only the switching gear element of the first gear wheel arrangement needs to be adjusted in order to switch not only the first gear wheel arrangement but also the second gear wheel arrangement. This makes actuation significantly easier. For example, it is easier to construct an actuation device that only needs to be connected to or to control the switching gear element of the first gear wheel arrangement in order to act not only on the first gear wheel arrangement but also on the second gear wheel arrangement.

A configuration can provide for the switching gear element of the second gear wheel arrangement being tightly fixed in the first setting position of the switch actuator relative to the gearbox holding structure, in other words for example the gearbox housing, and to be rotatable in the second setting position relative to the gearbox holding structure. In the fixed position of the switching gear element of the second gear wheel arrangement, planetary gears, in other words the at least one gear wheel of the second gear wheel arrangement, can roll the switching gear element. In the rotatable position of the switching gear element of the second gear wheel arrangement, the at least one gear wheel, for example a planetary gear, can take the second gear wheel arrangement of the switching gear element with it, or rotate it simultaneously.

The switching gear element of the second gear wheel arrangement advantageously has at least one anti-rotation contour to engage in a positive-locking counter-contour of the gearbox holding structure and/or of the switching gear element that forms the switch actuator for the fixed regulation of the gearbox holding structure, for example the gearbox housing. The anti-rotation contour and the positive-locking counter-contour can for example be a pairing of teeth and spaces between the teeth or teeth recesses, a pairing of an anti-rotation projection and an anti-rotation recess, a groove structure or the like.

The switching gear element which forms the or a switch actuator can have arch-shaped teeth on its inner circumference as a positive-locking counter-contour, by means of which teeth in the first setting position the anti-rotation contour engages with the gear element, in particular the or a switching gear element, which can be switched by the switch actuator and in the second setting position is engaged with the at least one gear wheel of the first gear wheel arrangement, for example the radial outer teeth. For example, this gear wheel meshes with the switching gear element or switch actuator.

In the first setting position it is advantageous if the switching gear element which forms the switch actuator is fully disengaged from the at least one gear wheel of the first gear wheel arrangement, in particular is out of direct engagement with the at least one gear wheel of the first gear wheel arrangement or all gear wheels of the first gear wheel arrangement. Consequently the switching gear element only then fulfils the function of a switch actuator for the other switching gear element, the switching gear element in the second gear wheel arrangement.

A configuration in which the switching gear element of the first gear wheel arrangement engages with the at least one gear wheel of the first gear wheel arrangement, for example a planetary gear set or at least two planetary gears of the first gear wheel arrangement if the switch actuator is in the first switch position is also possible. This is a possible configuration in the case of a coupling of planetary gear sets, with the components of the first gear wheel arrangement and the second gear wheel arrangement making up the configuration.

In the second setting position of the switch gear element which forms the switch actuator, the switching gear element of the at least one second gear wheel arrangement, in other words the switched switching gear element, can be rotated relative to the gearbox holding structure such that it can be moved along by the at least one gear wheel of the at least one second gear wheel arrangement. Consequently the switching gear element of the second gear wheel arrangement can rotate into the second setting position of the switch actuator and therefore be moved along by the one or more gear wheels of the second gear wheel arrangement.

The switching gear element which can be switched by the switch actuator is expediently mounted in a rotatable manner relative to the gearbox holding structure. It can also, in addition or alternatively to this, be received onto or into the gearbox holding structure in a linear, fixed manner. This is advantageous in particular if the switching gear element of the second gear wheel arrangement is fixed relative to a rotational axis of the gearbox output or its own rotational axis.

A bearing can be arranged on the gearbox housing or the gearbox holding structure for the rotatable mounting of the switching gear element which can be switched by the switch actuator of the second gear wheel arrangement, for example a bearing groove and a bearing projection, a roller bearing, in particular a needle bearing, ball bearing or the like. A supporting body is preferably arranged in a locally fixed manner relative to the gearbox holding structure, on the outer circumference and/or inner circumference of which the switching gear element of the second gear wheel arrangement is rotatably mounted. The at least one gear wheel of the second gear wheel arrangement is also provided for the rotatable mounting of the switching gear element. Consequently, the switching gear element of the second gear wheel arrangement can be rotatably mounted on one or more gear wheels of the second gear wheel arrangement or using the gear wheels. This is possible for example if the switching gear element of the second gear wheel arrangement is designed as a hollow wheel which surrounds the planetary gear set in a ring and is mounted on the planetary gear set.

It is further advantageous if the switching gear element of the second gear wheel arrangement can only be switched or actuated by the switching gear element which forms the switch actuator or the switching gear element of the first gear wheel arrangement. An actuating device which for example can be actuated directly by the operator from outside of the machine housing is therefore only linked to the switching gear element of the second gear wheel arrangement by means of the switching gear element of the first gear wheel arrangement and/or not directly.

The switching gear element which forms the switch actuator is expediently displaceably mounted in a linear manner relative to the gearbox holding structure, for example parallel to a rotational axis of the gearbox drive and/or the gearbox output or its own rotational axis, between the first setting position and the second setting position. The switching gear element which forms the switch actuator is expediently rotatable in one, two or more in particular settings positions relative to the gearbox holding structure. It is possible for as it were the switching gear element of the first gear wheel arrangement to be rotatable in a setting position, for example in an intermediate setting position that is between two further setting positions. The operator can then as it were move the switch actuator from a fixed setting position into a rotatable setting position relative to the gearbox housing or the gearbox holding structure by for example adjusting it in a linear manner, rotating it or the like.

It is further advantageous if one or more, in particular all, of the switching gear elements is/are spring-loaded in a respective switch position. In this way, for example, the switching gear element of the second gear wheel arrangement can be spring-loaded by means or a spring arrangement in one or both of the first and second setting positions. If the teeth of one of the switching gear elements do not fit with the respective gear wheel of the first or second gear wheel arrangement to be switched or meshed, the spring loading ensures that where the teeth do match the matching teeth glide into the respective places.

The gear wheels of the first gear wheel arrangement which are or can be in rolling engagement and the at least one second gear wheel arrangement are expediently different from one another in terms of their diameter and/or they have different roller circumferences from one another in terms of their diameter for the rolling engagement with the respective assigned switching gear element. This means that different speed ratios can expediently be set between the gearbox drive and the gearbox output.

The first gear wheel arrangement and the second gear wheel arrangement expediently form a first gearbox step, wherein the gearbox has at least a second gearbox step, for example a planetary step. The first gearbox step is upstream or downstream of the gearbox output of the second gearbox step. In particular, the gearbox steps are therefore arranged sequentially one behind the other.

The second gear wheel step can be a gearbox step providing a fixed speed ratio, in other words merely a gearbox step that decreases or increases speed and cannot be switched. A switchable configuration is, however, preferred. The second gearbox step can expediently be switched between at least two switch positions in which a speed ratio between a drive of the first gearbox step and an output of the second gearbox step is different. This means, for example, a four-speed gearbox can be achieved.

The gearbox is expediently a planetary gear. Other types of gear are, however, also easily possible.

The first and/or the second setting gear element expediently comprises a hollow wheel or is formed by a hollow wheel.

The embodiment of the invention described below in greater detail in the drawing shows a screwing machine or drilling machine. Of course the invention can also be used in other manual machine tools, for example milling machines, cutting machines, saws, grinding machines, polishing machines and the like. The gears and/or the actuating device can, however, also be used in manual machine tools, for example, which have a tool holder that is driven in an oscillatory manner, for example moved backwards and forwards in a linear manner.

The manual machine tool expediently has a tool holder for a tool and/or a tool, for example a drilling tool, screwing tool or the like. A cutting tool, milling tool or the like can, however, also be provided.

The gearbox output of the gearbox is expediently directly rotationally coupled to a tool holder on the manual machine tool. A recess for a screw bit, drill chuck, screw chuck or a tool chuck of the like can be provided, for example. It is also advantageous if a striking mechanism is arranged on the gearbox output, for example an axial striking mechanism.

It is also possible for an angle gear to be present between the gearbox and a tool holder, for example an angular gearbox or a conversion gearbox, which converts the rotating output movement of the gearbox output into an oscillatory linear movement or a hypercycloid and/or eccentric movement of the tool holder.

An embodiment of the invention is described below on the basis of the diagrams, in which:

BRIEF DESCRIPTION OF THE DRAWINGS

FIG. 4 is an exploded diagram of a powertrain of the manual machine tool including the gearbox and with a drill chuck, FIG. 5 is an exploded diagram of an actuating device for the gearbox, FIG. 6 is a lower view of an actuating part of the actuating device according to FIG. 5, FIG. 7 is a planar view of the actuating part according to FIG. 6 installed into a housing of a manual machine tool, FIG. 8 is a lateral view of the gearbox according to FIG. 3, FIG. 9 is a sectional view of the gearbox according to FIG. 8 along a cutting line B-B in FIG. 8, FIG. 10 is a frontal view of the gearbox according to the above figures in the direction of sight according to FIG. 1 in a first and a second switch position of the gearbox, FIG. 11 is the view according to FIG. 10 but in a third and fourth switch position of the gearbox, FIG. 16 is a lower frontal view of the actuating part, FIG. 17 is a section through the actuating part along a cutting line G-G in FIG. 16, FIG. 18 is a sectional view of the actuating part along a cutting line H-H in FIG. 16, FIG. 19 is a sectional view roughly corresponding to cutting line F-F in FIG. 11 of a modified gearbox housing of the gear and the actuating part according to FIGS. 16 to 18, FIG. 20 is a perspective diagonal view of the actuating part according to FIGS. 16 to 18 and the assigned locking part, FIG. 21 is a further perspective diagonal view of the actuating part and the locking part, FIG. 22 is a perspective view of the actuating part and the locking part which is engaged with a locking structure of the actuating part.

Figure 1:
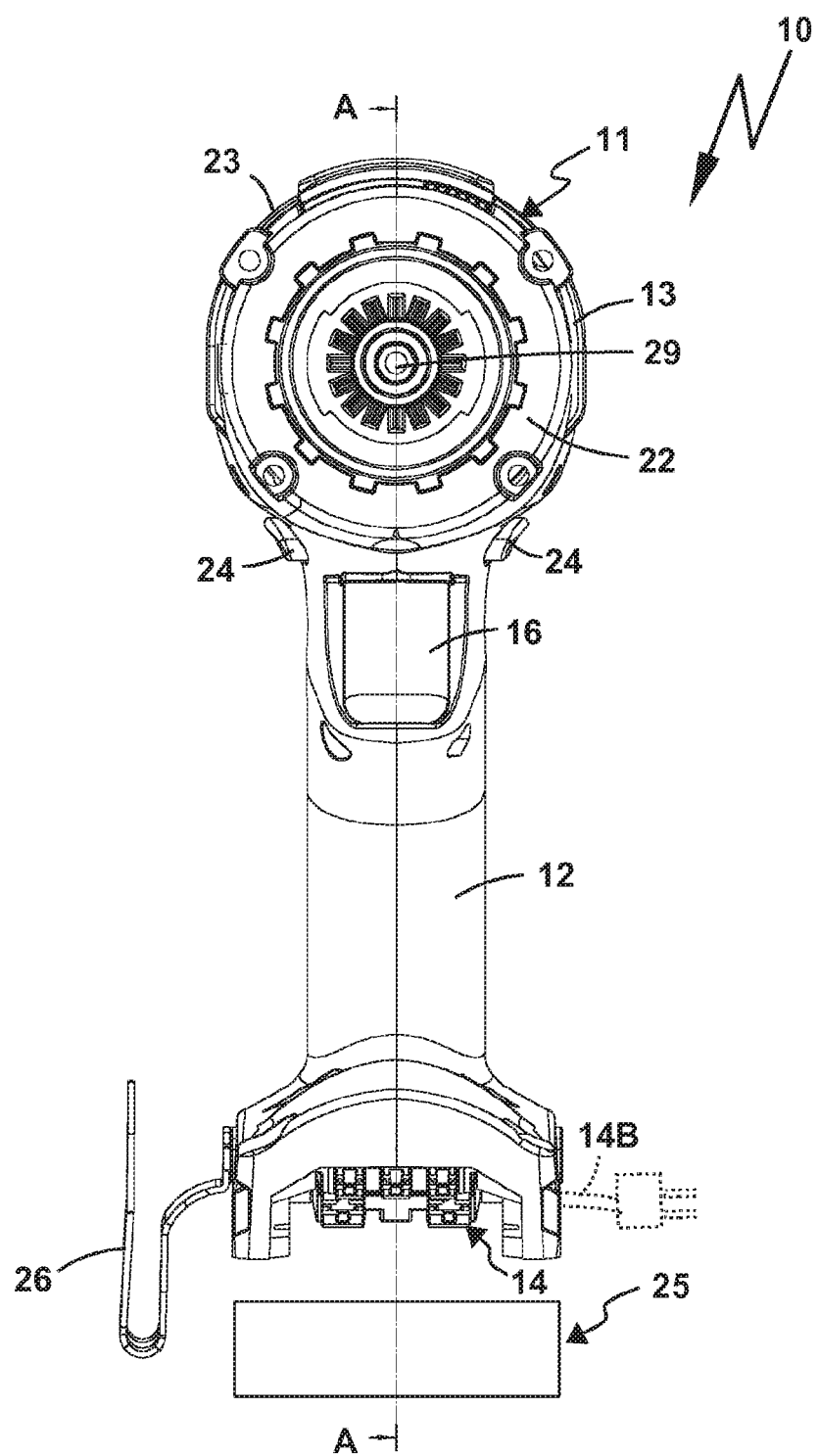
FIG. 1 is a frontal view of a manual machine tool according to the manual machine tool, which is shown in FIG. 2 in a transverse section along cutting line A-A in FIG. 1.

A manual machine tool 10, for example a screwing device, has a machine housing 11 which is preferably pistol-like in shape. An operator can grip the machine housing 11 and therefore the manual machine tool 10 using a handle section 12 which protrudes from a motor section 13 of the machine housing 11. An energy storage interface 14 is provided on a foot area or a free end area of the handle section 12 which faces away from the motor section 13, to which energy storage interface an energy storage device 25 such as a battery pack can be attached. Consequently the manual machine tool 10 can be operated in a self-sufficient and wireless manner, but it does not have to do so. A manual machine tool having a mains connection 14B for an AC network, in particular a connection cable with a plug and/or a socket for a connection cable, in particular a power cable, or a manual machine tool with an energy storage interface and a mains connection is also easily possible.

The energy storage interface 14 supplies a power supply device 15 with electrical energy. The power supply device 15 can be actuated by means of a switch 16 which is preferably arranged on the handle section 12 to supply power to a drive motor 17 that is received in the motor section 13 of the machine housing 11, in particular to set its speed and/or torque.

The drive motor 17 has a motor shaft 18 which extends in a longitudinal direction of the motor section 13. The motor shaft 18 is rotatably mounted on motor bearings 19. The drive motor 17 has for example an exciter coil arrangement 20 which is penetrated by the motor shaft 18 and which is rotatably received in a rotor, in particular a permanent magnet rotor, a squirrel-cage rotor or the like.

The drive motor 17 is arranged in the machine housing 11 in a fixed position. Its motor shaft 18 extends from a rear wall 21 in the direction of a front face 22 of the motor section 13. An upper side wall 23 of the machine housing 11 is provided on the side of the motor section 13 which faces away from the handle section 12. A rotation direction alternator 24 is preferably arranged between the handle section 12 and the motor section 13, by means of which the direction of rotation of the drive motor 17 can be set or changed.

A hook element 26 is preferably provided on a free end area or another point in the machine housing 11 to hang up the manual machine tool, for example on a user's belt.

A motor output 27 of the drive motor 17 drives a gearbox 40 of the manual machine tool.

The gearbox 40 has a gearbox drive 41 designed as a drive wheel and/or drive shaft or having a drive wheel and/or a drive shaft, which gearbox drive is connected to the motor drive 27 in a fixed manner.

A gearbox drive 42 of the gearbox drives a tool shaft 28, for example, which protrudes from the front face 22 of the machine housing 11.

The tool shaft 28 has a tool holder 29 for example for a tool 30, for example a drilling tool, a screwing tool or the like. The tool shaft 28 is for example rotatably mounted by means of a bearing 31 on the machine housing 11. The tool shaft 28 can also be mounted directly by the gearbox 40 or on the gearbox 40, for example using a bearing 43.

It is also advantageous if in a manual machine tool according to the invention a striking mechanism for example an axial striking mechanism and/or rotational striking mechanism is arranged on the output of the gearbox. A striking mechanism of this kind can also easily be integrated into the gearbox. A striking mechanism 200 is provided in the specific embodiment.

An impact body 201 of the striking mechanism 200 is for example formed by the tool shaft 28 or fixed to this. The impact body 201 is for example a ring which is penetrated by the tool shaft 28 and is connected to the tool shaft 28 in a manner that prevents it from rotating and that is fixed in an axial direction.

The impact body 201 is force-actuated by means of a spring 202 in a forwards direction SW1, in other words towards the tool holder 29.

Figure 2:
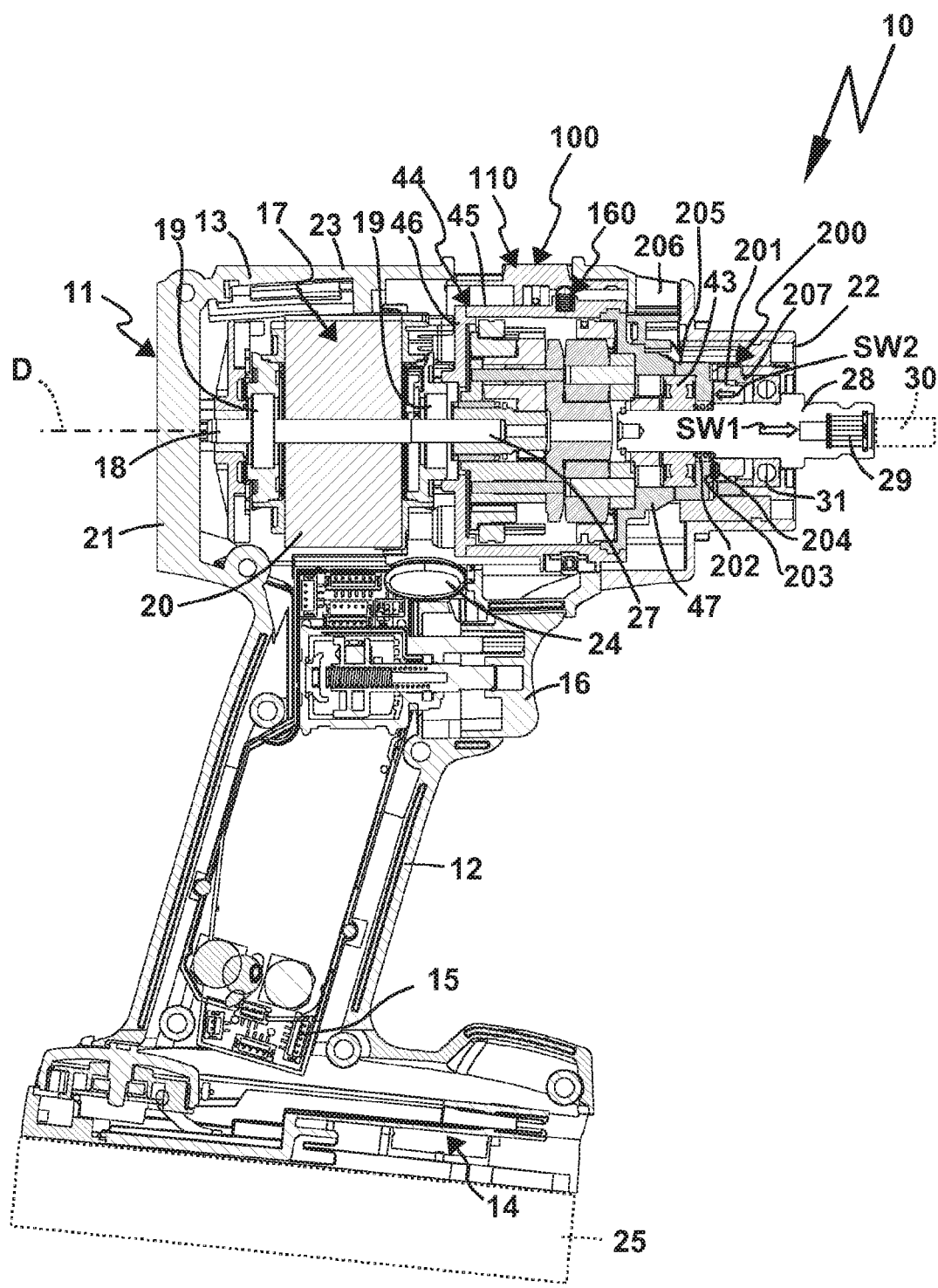

The striking mechanism 200 can be switched between a described striking operation and a non-striking operation, for example by means of an actuation of an actuating element 206 that can be gripped by the operator. The actuating element 206 comprises, for example, a slider or a rotary element. The actuating element 206 can be adjusted as a setting body 207 between the switch position shown in FIG. 2 and assigned to the striking operation in which the tool shaft 28 including the bearing 31 can be displaced in a linear manner relative to the rotational axis D, in other words has an end clearance and therefore teeth 203, 204 can engage with one another, and a further switch position that is not shown in the drawing which represents a non-striking operation and in which the teeth 203, 204 are kept apart from one another. The bearing 31 is held on the setting body 207. The tool shaft 28 is displaceably mounted on bearing 43 relative to the rotational axis.

The teeth 203 are arranged on an abutment body 205 which is arranged between the bearing 43 and the impact body 201 and is fixed in position (prevented from rotating and fixed to prevent displacement) relative to the machine housing 11. The teeth 203 are opposite the teeth 204 arranged on the impact body 201. The teeth 203, 204 are arranged on the respective front faces of the abutment body 205 and the impact body 201. The teeth 203, 204 are preferably angular teeth. The teeth 203, 204 preferably extend in a ring-shaped or partially ring-shaped manner about the rotational axis D of the tool shaft 28.

If there is pressure in a direction of force SW2 on the tool shaft 28, for example if the tool 30 is loaded against the machine housing 11 by means of a screw or a workpiece, the teeth 203, 204 glide along one another, wherein they adjust the impact body 201 in the direction of force SW2 such that a spring 202 force-actuated with a direction of force SW1 is tensioned. If the teeth 203, 204 are further rotated from one pair of teeth into the next pair of teeth, they can immerse into one another suddenly when loaded by the spring 202, such that a strike occurs in the direction of force SW1 on the tool shaft 28 and consequently the tool holder 29.

An embodiment that is only partially indicated in FIG. 4 provides for a recess chuck 32, for example a drill chuck, instead of the tool shaft 28, which recess chuck is suitable for holding for example the tool 30.

The gearbox 40 is a four-speed gearbox. The gearbox 40 can therefore be switched between four gears or switch positions S1, S2, S3 and S4 which are showing in FIGS. 12, 13, 14 and 15.

The gearbox is received in a gearbox housing 44. The gearbox housing 44 has a circumference wall 45 which delimits an essentially cylindrical inner space in which the gearbox components, pinions and the like of the gearbox are essentially received. On the front face the gearbox housing 44 is covered by front walls 46, 47, for example covers. The front walls 46, 47 have openings 48 through which the motor drive 27 can be connected to the gearbox drive 41 and the tool shaft 28 or the recess chuck 32 to the gearbox drive 42 of the gearbox 40. The openings 48 are for example penetration openings.

The gearbox housing 44 is received in the machine housing of the manual machine tool 10 in a manner that prevents it from rotating, which is why for example teeth 49 and/or an anti-rotation projection 49A are provided on the front wall 47 which faces aware from the tool holder 29 and/or a circumference contour 50 designed in the manner of anti-rotation protection are provided on the front wall, which faces away from the drive motor 17.

Consequently the gearbox housing 44 which forms a base gearbox housing (the circumference wall 45) and the front walls 46, 47 which form the covers essentially tightly enclose the gearbox components of the gearbox 40 described below, which is which sealing elements, in particular textile seals, plastic seals, O-rings, labyrinth seals etc. can be provided.

The gearbox 40 has a first gear step G1 and a second gear step G2. The first gear step G1 forms an initial gear step and can be driven by the gearbox drive 41. The second gear step G2 forms an output gear step and drives the gearbox output 42 of the gearbox 40.

DETAILED DESCRIPTION

The gear steps G1 and G2 are planetary gear steps. Overall, the gearbox 40 is designed as a planetary gearbox.

The gear step G1 comprises a sun wheel 51 which is arranged on the drive wheel or gearbox drive 41 or is in one piece with the gearbox drive 41. The sun wheel 51 meshes with the planetary gears 51 which are rotatably mounted on a bar or planetary gear support 53. For example the planetary gears 52 are rotatably mounted on axis elements 55 which protrude in front of a carrier body 54. The planetary gears 52 can be mounted directly onto the axis elements 55 or as preferred in the embodiment by means of roller bearings 56, in particular ball bearings or needle bearings, which improves the rotatability and the bearing. On the one hand the axis elements are on opposite sides of the carrier body 54 and on the other hand there is an output 57 on the carrier body which forms a sun wheel 58 for the second gear step G2. Teeth 59 are provided on a radial outer circumference of the planetary gear support 53 or the carrier body 54.

The planetary gears 52 form a planetary gear set 60, to which a first hollow wheel 61 and a second hollow wheel 62 are assigned.

The planetary gears 52 are step planetary gears as it were. The planetary gears 52 have roller circumferences 63, 64 with different diameters which are assigned to the first and the second hollow wheels or mesh with these when a corresponding switch position of the gearbox 40 is set.

The hollow wheel 61 is mounted in a rotatable manner in the gearbox housing 44 but cannot be displaced in an axial direction.

In the embodiment the hollow wheel 61 is received between the front wall 46 and the steps 65 of the planetary gears 52 in a sandwich-like manner.

The hollow wheel 61 is for example supported on its opposite front faces directly or indirectly on the front wall, and opposite this on the other front face on a step 65 provided between the roller circumferences 63, 64. A bearing plate 66 is preferably provided between the hollow wheel 61 and the front wall 46, which bearing plate is received inside the circumference wall 65 in rotatable manner or preferably in a fixed manner to prevent rotation as shown in FIG. 4 by means of corresponding outer circumference contours or rotation positive-locking contours.

It is also possible for the hollow wheel 61 to be held in a non-displaceable manner relative to a rotational axis D of the gearbox output 42 of the gearbox, for example by means of ring contours which are engaged with a support body 61 described in greater detail below. A ring projection can for example protrude in a radial, outwards direction in front of the support body 61 and engages in a ring groove on the inner circumference of the hollow wheel.

In the sense of a stabilisation or a mechanically resilient structure, it is also possible for the axis element 55 to be supported on a support body 67 on the free ends which face away from the carrier body 54. The support body 67 has recesses 68 for at least one of the axis elements 55. Support projections 69 are also provided which as it were delimit recess chambers or recess spaces for the planetary gears 62. It is possible but not essential for part of the axis element 55, in particular an axis element 55 which does not support any planetary gears to engage in the support projections 69 in a positive-locking manner, which is why the support projections 69 have recesses 69A for example. The planetary gears 52 are as it were received between the planetary gear support 53 and the support body 57 in a sandwich-like manner and rotatably mounted on the planetary gear support 53, namely the axis elements 55 of this.

It is understood that the support body 67 and the carrier body 54 can also be in one piece. The support body 67 is also optional, in other words the carrier body 54 would be sufficient to rotatably mount the planetary gears such that the support body 67 is not present in this case.

While the first hollow wheel 61 is mounted in the gearbox housing 44 in a rotatable but non-displaceable manner, the second hollow wheel 61 is mounted in the gearbox housing in a displaceable but non-rotatable manner relative to a setting axis SA. Anti-rotation projections 70 are provided on the radial outer circumference of the second hollow wheel 62 and engage in the anti-rotation recesses 71 of the gearbox housing 44. The anti-rotation projections 70 are preferably designed in the manner of slot grooves, cam followers or the like. They engage in the anti-rotation recesses 71. The anti-rotation recesses 71 are for example designed as longitudinal grooves 72 which run in parallel to the setting axis SA. The anti-rotation recesses 71 or longitudinal grooves 72 extend for example on the inside or on the inner circumference of the circumference wall. The anti-rotation projections 70 and/or the anti-rotation recesses may have different cross-sectional contours, for example have a wider or narrower design in the peripheral direction. It is not specifically about ensuring fundamental functionality that the hollow wheel 62 can be adjusted along the setting axis SA or in parallel to the setting axis SA on the gearbox housing 40 and/or relative to the planetary gear set 60.

Figure 12:
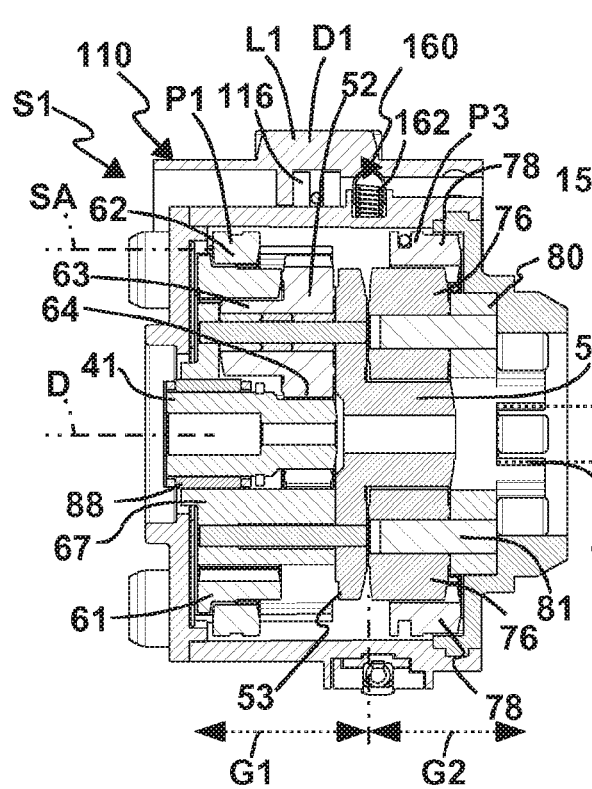
FIG. 12 is the gearbox according to the figures above in a sectional view according to the cutting line C-C in FIG. 10 in a first switch position.
Figure 14:
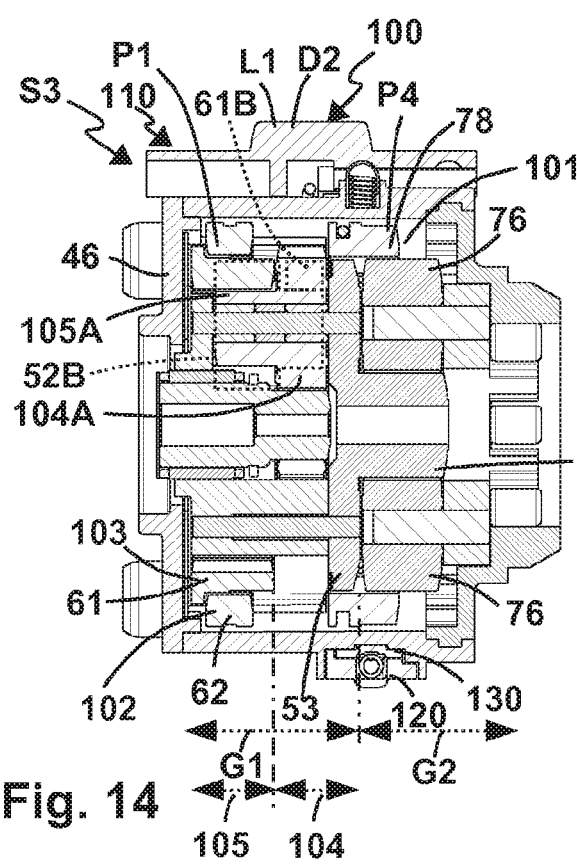
FIG. 14 is a cross-sectional view of the gearbox according to the above figures in a third switch position, for example according to a cutting line F-F in FIG. 11.

In the switch position shown in FIG. 12 and FIG. 14, namely the first switch position S1 and the third switch position S3, the second hollow wheel 52 is in a setting position P1 relative to the setting axis SA in which the second hollow wheel holds the first hollow wheel 61 in the gearbox housing in a manner which prevents it from rotating such that the planetary gears 52 mesh with inner teeth 75 of the first hollow wheel 61 with their smaller roller circumferences 63 and roll on the inner teeth 75. The second hollow wheel 62, which is received in the gearbox housing in a manner which prevents it from rotating, has anti-rotation contour on its inner circumference to hold the first hollow wheel 61 which has corresponding complementary rotational positive-locking contours on its outer circumference in a manner which prevents it from rotating. These rotational positive-locking contours and complementary rotational positive-locking contours are provided by inner teeth 73 of the second hollow wheel 62 and outer teeth 74 of the first hollow wheel 61, which can engage with one another in a positive-locking manner. Consequently the inner teeth 73 of the second hollow wheel 62 have on the one hand the function that the planetary gears 52 can roll on them and on the other hand the function of holding the first hollow wheel 61 in a manner which prevents rotation relative to the gearbox housing 44 and consequently also the machine housing 11 of the manual machine tool 10.

Figure 13:
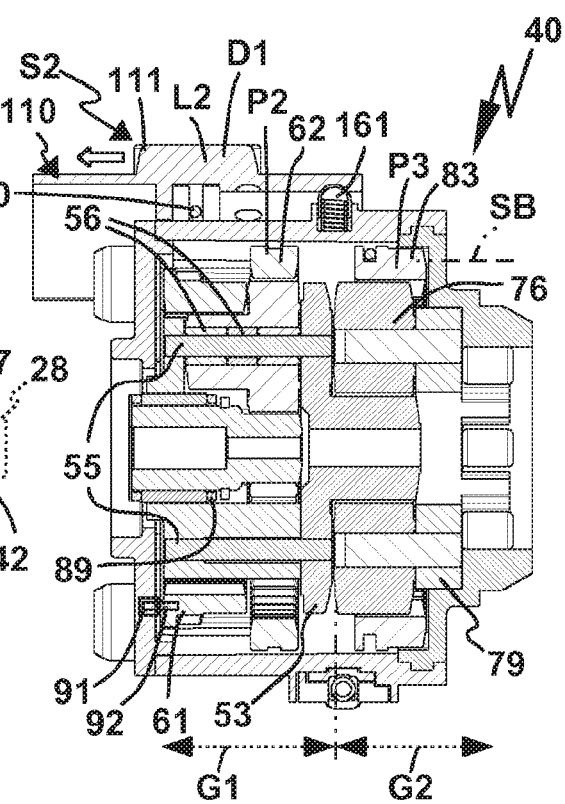
FIG. 13 is the gearbox according to FIG. 12 but in a second switch position.
Figure 15:
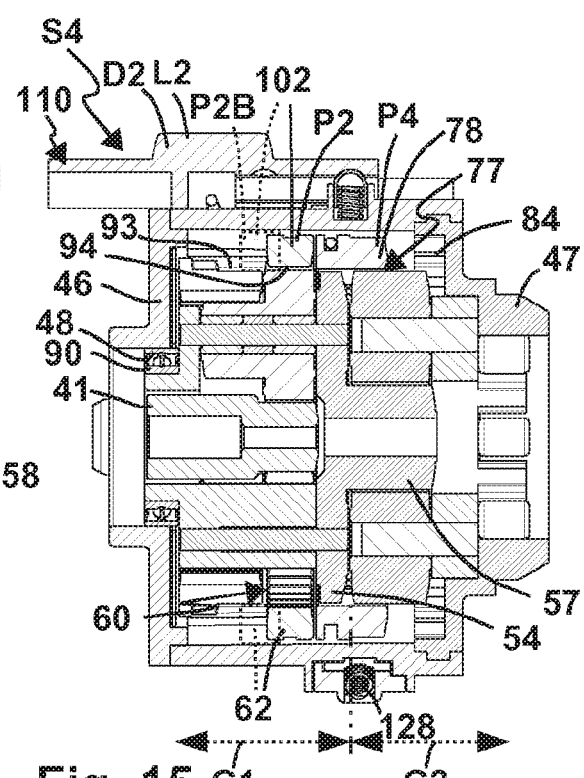
FIG. 15 is a cross-sectional view of the gearbox according to FIG. 14 but in a fourth switch position.

If the second hollow wheel takes the setting position P2 shown in FIGS. 13 and 15 relative to the setting axis SA, the first hollow wheel 61 is released for rotation. Consequently, the planetary gears 52 and the planetary gear set 60 can take the first hollow wheel 61 along with the rotation and experience no or minimal resistance as a result of the hollow wheel. In this situation, the planetary gears 52 roll with their larger roller circumferences 64 on the inner circumference, and consequently the inner teeth 73 of the second hollow wheel, which is essential for the switch positions shown in FIGS. 13 and 15, the second switch position S2 and the fourth switch position S4, of the gearbox 40. The output 57 of the first gearbox step G1 rotates into the second and fourth switch position at a high speed and with a lower torque than in the first and third switch position S1, S3.

The gear step G2 comprises planetary gears 76 of a planetary gear set 77 which engage on the one hand with the sun wheel 58, in other words the output of the first gear step G1, and on the other hand with a third hollow wheel 78. The third hollow wheel 78 is received in the gearbox housing 44 in a manner that is displaceable along a setting axis SB. The setting axis SA can be coaxial or parallel to the setting axis SB. The setting axes SA, SB are shown in FIGS. 12 and 13 by way of an example.

The setting axes SA, SB can also, for example, be coaxial with or concur with a rotational axis D of the gearbox 40 and/or the gearbox drive 41 and/or the gearbox output 42. The rotational axis D of the gearbox 40 is simultaneously the rotational axis of the drive motor 17 such that ultimately the gearbox 40, the drive motor 17 and the gearbox output 42 are coaxial. The tool holder 23 also rotates about the rotational axis D.

The planetary gears 76 are rotatably mounted on a planetary gear support 79, in other words a bar. The planetary gear support 79 has a carrier body 80 with the axis element 81 arranged on one side and the gearbox output 42 arranged on the opposite side. The axis elements 81 protrude from the sun wheel 58 and consequently the output 57 of the first gear step G1 such that the planetary gears 76 rotatably mounted on the axis elements 81 or rotatably mounted by the axis elements 81 are engaged with the output 57 or can be driven by this. The planetary gears 76 can be directly or indirectly rotatably mounted on the axis elements 81, for example by means of roller bearings, in particular needle bearings.

The planetary gear set 77 comprises for example four planetary gears 76 while the planetary gear set 60 comprises three planetary gears 52. These figures should not, however, be understood as restrictive. One planetary gear set can very much also comprise two planetary gears, five planetary gears or another number of planetary gears.

The radial outer circumference of the hollow wheel 78 has anti-rotation projections 83 which are engaged with the anti-rotation recesses 84 on the gearbox housing 44, for example these can be applied to the cover or the front wall 47. In the switch positions S1 and S2 of the gearbox 40 shown in FIGS. 12 and 13, the third hollow wheel 78 takes on a setting position P3 relative to the setting axis SB in which the third hollow wheel 78 is fixed in a manner which prevents rotation relative to the rotational axis D or the gearbox housing 44. The anti-rotation projections 83 then engage in the anti-rotation recesses 84.

In a setting position P4 relative to the setting axis SB, however, the anti-rotation projections 83 of the third hollow wheel 78 are arranged free from or beyond the anti-rotation recesses 84 such that the hollow wheel 78 can rotate about the rotational axis D.

In setting position P3, the fixed position of the third hollow wheel 78 to prevent against rotation, the outer circumferences of the planetary gears 78 roll on inner teeth 85 of the hollow wheel 78. The second gear step G2 causes a reduction and speed and therefore an increase in torque from its input side to its output side or from its drive to its gearbox output 42.

In the setting position P4 of the hollowing wheel 78, however, the wheels 76 continue to be engaged with the inner teeth 85. The inner teeth 85 of the hollow wheel 78, however, continue to be engaged with the outer and radially outer teeth 59 or the planetary gear support 53. The hollow wheel 78 is therefore fixed in a manner which prevents rotation relative to the planetary gear support 73. In addition to this, the planetary gears 76 are mounted in a manner which prevents rotation between the teeth of the sun wheel 78 and the inner teeth 85 of the third hollow wheel 78. Consequently, in this situation the second gearbox step D2 has a speed ration of i=1 between an input side and an output side and therefore does not cause either a change in speed or a change in torque.

The gearbox output 42 is provided on the planetary gear support 79. The planetary gear support 79 has support projections 86 which protrude from the carrier body 80, between which for example the tool shaft 28 can be arranged or by which the tool shaft 28 can be held. For example the tool shaft 28 is held by support elements 87 which in turn are supported on the support projections 86.

The gearbox drive 41, which can also be called a drive shaft, is rotatably mounted on a pivot bearing 88, in particular on a roller bearing, in the embodiments shown in FIGS. 12 to 14. The pivot bearing 88 is supported on an inner circumference of an opening of the support body 67 and is for example axially secured relative to the rotational axis D by means of a snap ring 89.

In the bearing concept shown in FIG. 15, however, the support body 67 is rotatably mounted on the cover or the front wall 46 of the gearbox housing 44 by means of a pivot bearing 90. The pivot bearing 90, for example a ball bearing, needle bearing or other roller bearing (a slide bearing is also possible) is for example arranged and supported in the opening 48.

An actuating device 100 is used to switch and actuate the gearbox 40. The hollow wheel 78 can be adjusted in a linear manner between the setting positions P3, P4 using the actuating device 100. The hollow wheel 78 forms a first switching gear element 101. The hollow wheel 62 can also be adjusted in a linear manner between the setting positions P1 and P2 using the actuating device 100 and is coupled to the actuating device 100 in order to do this. The hollow wheel 62 forms a second switching gear element 102.

A third switching gear element 103 is not switched directly by the actuating device 100 but instead by the switching gear element 102 in between. The switching gear element 103 is provided by the hollow wheel 78.

The planetary gear set 60 forms a components of a first and a second gear wheel arrangement 104, 105, see FIG. 14. The first gear wheel arrangement 104 is assigned to the first switching gear element 102 and comprises for example the roller circumferences 64 of the planetary gears 52. The second gear wheel arrangement 105 is as it were coupled or connected tightly to the first gear wheel arrangement at least in terms of the planetary gears 52. Each planetary gear 52 has various roller circumferences 63, 64 and therefore forms two partial planetary gears. The partial planetary gear with the roller circumference 63 is assigned to the hollow wheel 61 and therefore to the switching gear element 103 and the gear wheel arrangement 105 as a gear wheel 105A. The partial planetary gear with the roller circumference 64 is assigned to the hollow wheel 62 and therefore to the switching gear element 102 and the gear wheel arrangement 104 as a gear wheel 104A. The partial planetary gears are in one piece or coupled tightly to one another as a result of their design as stepped planetary gears. It is easy to imagine, however, that the partial planetary gears can also be individual planetary gears that are connected to one another in a manner which prevents rotation or are rotatable relative to one another in a different embodiment.

The switching gear element 102 acts on the one hand as an active switching element relative to the gear wheel arrangement 104 by being directly engaged with the larger roller circumferences 64 of the planetary gears 52 in the setting position P2. In the setting position P1, however, the hollow wheel 62 is adjusted away from the planetary gears 52, in other words the inner teeth 73 no longer mesh with the roller circumferences 64.

In the setting position P1, however, the hollow wheel 62 is a switch actuator for the other hollow wheel 61 which is held in a manner which prevents rotation by the hollow wheel 62 or the switching gear element 102 relative to the gearbox housing 44 which forms a gearbox holding structure 44A by means of the interlocking teeth, namely the outer teeth 74 and therefore an anti-rotation contour 93 and the inner teeth 73 and therefore a positive-locking counter-contour 94. Consequently, the switching gear element 103 is as it were switched by the switching gear element 102.

At this point it should be noted that teeth are not absolutely essential between the switching gear elements 102, 103 or the hollow wheels 61, 62. For example the switching gear element 102 can only adjust the switching gear element 103 in the direction of a positive-locking counter-contour that is fixed in the housing or locally fixed, in particular on the front wall, such that an anti-rotation contour 92 of the switching gear element 103 with the positive-locking counter-contour 91 can be adjusted into a hold that prevents the switching gear element 103 from rotating relative to the gearbox holding structure, in other words the gearbox housing 44 (FIG. 13). The anti-rotation contour 92 is for example a positive-locking projection that runs in parallel to the setting axis SA; the positive-locking counter-contour 91 is a corresponding positive-locking recess, for example a blind hole. Teeth as anti-rotation contours and positive-locking counter-contours are, however, advantageous.

No direct coupling between the actuating device 100 and in particular the actuating part 110 of this and the switching gear element 103 therefore needs to be provided to switch the gear wheel arrangement. The structure of the actuating device is therefore simpler. The gearbox 40 is built shorter. The actuating device 100 is also simpler and more comfortable to handle, as will become clearer below.

The actuating device 100 comprises the actuating part 110 with an actuating handle 111. The actuating handle 111 is an opening 33 arranged on an upper side wall 34 of the housing 11 of the manual machine tool 10 and therefore easily accessible for a user.

Numbers 1, 2, 3 and 4 or other markings 35 can be arranged on the housing 11, for example on the edge areas of the opening 33, which markings are assigned to the respective switch positions S1, S2, S3 and S4. The actuating handle 111 can be displaced and/or pivoted within the opening 33. The actuating handle 111 can be adjusted into the region of a respective marking 35, in this case therefore into a corner region of the opening 33 to set the switch positions S1, S2, S3 and S4. Direct switching or setting of the actuating handle 111 from each of the switch positions S1, S2, S3 and S4 into each of the other switch positions S1, S2, S3 and S4 without setting an intermediate switch position is possible. The gearbox 40 can for example be adjusted directly from the switch position S1 (actuating handle 111 is shown as a dashed line in FIG. 7) into the switch position S4 (actuating handle 111 is shown as a solid line in FIG. 7) without stopping at the intermediate switch positions S2 or S3.

The actuating handle 110 is provided on an upper side 114 of an in particular barrel-shaped or curved wall body 112, the lower side 113 of which faces towards the gearbox housing 44. A curvature of the wall body 112 corresponds approximately to a curvature of the circumference wall 45 of the gearbox housing 44 such that the wall body 112 can be moved along the circumference wall 45 in the manner of a cover or a cover part or wall section.

The actuating part 110 is arranged on a traction tine 120, which in turn is pivotably mounted on the gearbox housing 44 in a pivotable or rotatable manner, in particular on the outer circumference of the circumference wall 45 about a pivot axis MA which preferably concurs with the rotational axis D of the gearbox output 42. This means the actuating part 110 can pivot about the pivot axis MA and therefore an actuating pivot axis BS between actuating positions D1 and D2.

The carrier ring 120 has a ring body 121 which is rotatably mounted in a ring guide 145 of the gearbox housing 44. The narrow sides of the ring body 121 are for example guided by circumference projections 146 which protrude from the circumference wall 45.

A linear guide 123 for the actuating part 110 is provided in the free longitudinal end areas 122 of the carrier ring 120 such that this is rotatably mounted on the carrier ring 120 along an actuating longitudinal axis BL between actuating positions L1 and L2.

The linear guide 123 comprises linear guide sections 124 arranged directly on the longitudinal end areas 122, which longitudinal guide sections are arranged at an angular distance from one another corresponding to the angular distance between the longitudinal end areas 122. Consequently the actuating part 110 is as it were a connecting link or a binding link which connects the longitudinal end areas 122 of the carrier ring 120 to one another.

Linear guide projections 115 are provided on the lower side 113 of the actuating part 110, which linear guide projections engage in the linear guide sections.

The longitudinal end areas 122 of the carrier ring 120 already have a width or a length corresponding to the actuating longitudinal axis BL such that they are in principle sufficient for the linear guidance of the actuating part 110. Furthermore, the actuating part 110 can be guided into guide recesses, for example grooves, on the outer circumference, for example longitudinal sides and/or transverse sides, or the slot or opening 33 of the upper side wall 34.

There is additional and improved support, however, in the form of support projections 129 which protrude in front of the longitudinal end areas 122 of the carrier ring 120 relative to the actuating longitudinal axis BL or the rotational axis. Further linear guide sections 125 are provided on the support projections 122 in which the linear guide projections 115 engage and by means of which the linear guide projections 115 are guided relative to the actuating longitudinal axis BL. The linear guide sections 124, 125 are for example longitudinal grooves, the transverse width of which roughly corresponds to a transverse width of the linear guide projections 115 relative to the actuating longitudinal axis BL.

An embodiment could provide for guide cams to be provided on the longitudinal end areas 122 of the carrier ring 120 in the manner of the guide cams 133 described below in greater detail, with which a first coupling element 140 which in turn is connected to the switching gear element 101 and therefore the hollow wheel 78 can be driven.

The guide cams 133 are, however, provided on a transmission part 130, which in turn can be rotated relative to the actuating pivot axis BS or a rotational axis of the carrier ring 120. The transmission part 130 has a ring body 131, on the longitudinal end areas 132 of which the guide cams 133 are provided. The longitudinal end areas 132 are for example designed in the manner of plate bodies. A ring slot 137 is provided between the longitudinal end areas on the ring body 131, in other words an intermediate space between ring sections 138 which extend between the longitudinal end areas 132.

The transmission part 130 is arranged in an inner space of the carrier ring 120. A carrier 136 protrudes from a radial outer circumference of the ring body 132, which carrier is coupled to a carrier 126 of the carrier ring 120 in a manner which permits movement. Fixed coupling would also be possible here. The carrier 126 is, however, displaceably or rotatably mounted on the carrier ring 120. The carrier 127 is movably mounted in a cam 127 of the carrier ring 120. The cam 127 extends on the carrier ring in a ring-like manner. It is provided on the ring body 121. The carrier protrudes in a radial direction inwards in front of the ring body such that it can engage with the carrier 136. A plug connection between the carriers 126, 127 [sic—136] is provided, for example. The cam 127 is therefore arch-shaped or ring-shaped and extends about the pivot axis MA of the carrier ring 120 in order to pivot the carrier ring 120 relative to the gearbox housing 44.

The carrier is spring-loaded by means of a spring arrangement 128, for example a coil spring. If the carrier ring 120 is pivoted about the pivot axis MA, the carrier 126 is also moved such that supported by the spring arrangement 128 this rotational movement or rotational force is applied to the transmission part 130 which ultimately converts the rotational movement into a linear movement for the coupling element 140 and the switching gear element 101.

The coupling element 140 is for example formed by a spring bow 141. Longitudinal ends 142 of the coupling element 140 protrude in front of a ring section of the coupling element 140 in a radial direction and engage in the guide cams 133 in the manner of cam followers. The guide cams 133 are for example angular cams. A coupling part recess 143, for example a ring groove, is provided on the switching gear element 101 in the radial direction, in which coupling part recess the coupling element 140 engages, in particular with the ring section 144. A certain spring property also brings the elastic longitudinal ends 142 of the coupling element 140 with it such that ultimately the spring arrangement 128 would not be necessary.

An indentation 147 can be provided on the ring guide 145 in which the ring body 131 and consequently the transmission part 130 engage for the longitudinal end areas 132 of the transmission part 130, resulting in a certain locking effect.

The longitudinal ends 142 of the coupling element 140 which is arranged inside the gearbox housing 144 protrude through slots or longitudinal grooves in front of the circumference wall 45 and engage in the guide cams 133. If, therefore, the actuating part pivots about the actuating pivot axis BS, the carrier ring 120 also pivots about the pivot axis MA at the same time, wherein this pivot movement is deflected by a deflection gear 135 which among other things comprises the guide cams 133 and the coupling element 140 and in particular its longitudinal ends 142 into a linear setting movement for the setting element 101 between setting positions P3 and P4.

Unlike in the embodiment, in principle the transfer of the linear movement of the transmission part 110 relative to the actuating longitudinal axis BL could be transferred directly into a linear actuating movement of a second coupling element 150 which is arranged between the actuating part 110 and the switching gear element 102. In this case, however, the coupling element 150 is pivotably mounted about a pivot axis S such that a linear adjustment of the actuating part 110 along the actuating longitudinal axis BL in a direction in a linear adjustment of the setting gear element 102 is deflected into an opposite direction.

The coupling element 150 comprises a spring bow 159. The coupling element 150 comprises an actuating section 151 which engages in a guide recess 116 on the lower side 113 of the actuating part 110. Furthermore the actuating section 151 is received in a slot 124A between the linear guide sections 124, 125 of the carrier ring 120.

The spring bow 159 or the coupling element 140 is pivotably mounted on the gearbox housing 44 about the pivot axis S. The pivot axis S is between the actuating section 151 and the carrier projections 154 on the free end areas of the coupling element 150. Bearing recesses 157 are formed on the coupling element 150 between the carrier projections 153 in which the bearing pins 156 which protrude in a radial outer direction in front of the gearbox housing 44 or the circumference wall 45 engage. The bearing recesses 157 can be found between the actuating sections 152 and the carrier sections 153 of the coupling element 150. The actuating sections 152, 153 are as it were levers which stick out from the pivot axis S.

The carrier projections 154 which are for example thin wire ends engage in carrier indentations 155 of the switching gear element 102, and consequently therefore the hollow wheel 62. For example, holes or as in the embodiment grooves are provided as carrier indentations 155.

The second coupling element 150 extends in an arch shape about the switching gear element 102 but is only in contact with the switching gear element 102 in the region of the carrier recesses 154. In contrast to this, the coupling element 140 is ring-shaped as a result of its ring section 144 and engaged with the switching gear element 101 over a larger length.

In contrast to the coupling element 140, the coupling element 150 is arranged outside of the gearbox housing 44. Its carrier projections 154 stretch in an inner radial direction relative to the actuating pivot axis BS or the pivot axis MA in front of the carrier sections 153 and penetrate slots 158 on the gearbox housing 44 or circumference wall 45 such that they are engaged with the carrier indentations 155 of the hollow wheel 62 or the switching gear element 102.

The actuating device 100 can also be locked by means of a locking arrangement 160. The locking arrangement 160 comprises a locking part 161 which can engage in locking indentations 164 on the actuating part 110, for example on the lower side 113 of the wall body 112. The locking part 161 is spring-loaded by a spring 162 into its locking positive which engages in the locking indentations 164. The spring 162 and preferably the locking part 161 are received and/or guided in a recess or on a recess 163 of the gearbox housing, for example a cylindrical recess. Each locking indentation 164 is assigned to one of the switch positions S1, S2, S3 and S4 of the gearbox 40.

The operator can move the actuating part 110 into the actuating positions assigned to the respective switch positions relative to the actuating longitudinal axis BL and the actuating pivot axis BS, in which locking is expediently possible. The actuating part 110 can for example be locked and/or positioned in the actuating positions L1, D1 to set the switch position 1; in actuating positions L2, D2 to set switch position S2; in actuating positions L1, D2 to set the switch position S3 and finally in actuating positions D2, L2 to set the switch position S4.

The carrier ring 120 follows the movement of the actuating part 110 about the actuating pivot axis BS. The spring arrangement 128 thereby uncouples the actuating movement from the actual setting movement.

A spring system is also provided in connection with the coupling element 150. For example, the carrier sections 153 can spring or bend in an elastic manner relative to the actuating sections 151 and/or 152. This is achieved on the one hand by the design of the coupling element 150 as a spring bow 159. It is also, however, facilitated or improved by the fact that the bearing recess 157 is formed by a turning of the spring bow 159 such that the carrier sections 153 are elastic relative to the carrier actuating sections 152 relative to the pivot axis S.

FIG. 15 indicates that the switching gear element 102 can in principle also be used to couple the gear wheel arrangements 104 and 105 to one another in a manner which prevents them from rotating. For example, the switching gear element 102 in a setting position P2B is simultaneously engaged in both gear wheel arrangements 104 and 105 in a manner which prevents rotation and can rotate within the gearbox holding structure 44A or the gearbox housing 44. The switching gear element 102 which forms the switch actuator is therefore simultaneously engaged with both gear wheel arrangements 104 and 105. A ring groove or another slot of the like can for example be provided in the gearbox housing to ensure rotational freedom of the switching gear element 102.

The spring bow 159 or the coupling element 150 is pivotably mounted on the gearbox housing 44 about the pivot axis S such that a respective slide actuation of the actuating part 110 in a first direction is deflected into an opposite linear movement of the switching gear element 102. It is possible, however for the coupling element 150 for example to be coupled to the actuating part 110 in a fixed manner such that the above-mentioned reversal of movement does not occur or in other words the movement directions of the actuating part 110, the coupling element 150 and the switching gear element 102 run in parallel.

It is possible for the same gear gradations to be possible in the same setting positions of the actuating part 110 as in the case of the configuration described above, if the gearbox 40 is for example modified as follows and as indicated schematically in FIG. 14. In this configuration, for example, the planetary gears 52 are arranged on the planetary gear supports 53 such that the smaller roller circumference 63 is closer to the carrier body 54 than the larger roller circumference 64. This is indicated with a planetary gear 52B which is as it were rotated about 180° as the planetary gear 52 is arranged on the planetary gear support 53. If the radial inner hollow wheel which meshes with the smaller roller circumference is arranged closer to the carrier body 54 (which is indicated with a hollow wheel 61B in FIG. 14), the gear translations which can be set by means of the linear adjustment of the hollow wheel 62 between the setting positions P1 and P2 are precisely the reverse of those in the embodiment described above.

The locking arrangement 160 ensures that the actuating part 110 can be actuated in actuating positions B1, B2, B3 and B4 shown in FIG. 7 correspond to the switch positions S1, S2, S3 and S4 in the manner of a tilt-resistant or multi-stable toggle. The locking part 161 is deflected by a control surface arrangement 165 starting from intermediate settings or intermediate positions lying between the actuating positions B1-B4 into the respective actuating position B1, B2, B3 or B4.

The control surface arrangement 165 comprises for example narrow vertices 166, 167 which cross one another. The vertex 166 divided the vertex 167 as it were into vertex sections 167A, 167B. The locking part 161 cannot steady itself on the vertices 166, 167, but rather is in an unstable position or has an unstable position such that it is guided past the vertex 166 or 167 along gliding surfaces 168 or 169 in the direction of the direction of one of the locking indentations 164. A pair of gliding surfaces 168, 169 faces one another in each case and forms a depression or channel. When a locking part 161 glides along one of the gliding surfaces 168 or 169, it is as it were deflected into the depression or channel 170, which in turn leads to the locking indentation 164.

The depressions 170 run in a star shape to the point of intersection of the vertices 166, 167. These are elongated and straight in shape but can also easily be curved at least in sections. The locking indentations 164 are in the respective corner areas of a rectangle or a square. The control surface arrangement 164 extends between the locking indentations 164.

The locking indentations 164 have for example an approximately spherical inner contour or the shape of a spherical calotte. The spherical inner contour or calotte contour does not need to be closed or homogeneous but rather can be formed by support surfaces or surface sections in the region of an envelope surrounding a ball.

The gliding surfaces 168, 169 extend as sloping surfaces from the vertices 166, 167 into the locking indentations 164.

The locking part 161 has a spherical or at least convex curved gliding surface to glide along the control surface arrangement 165 or the locking structure 180. The curvature of the gliding surface 161A is designed such that the locking part 161 is prevented from taking up a stable position on the vertices 166, 167 and instead is unstable there so the locking part 161 is guided into one of the locking indentations 164. The gliding surface 161A can optionally be coated with polytetrafluorethylene or another coating of the like.

The advantage of the spring arrangement 168 in connection with the locking arrangement 160 is acknowledged. When the locking part 161 is deflected into one of the locking indentations 164, the spring arrangement 128 is tensioned at the same time so that ultimately the gearbox 40 can be switched into one of the switch positions S1-S4. The force which acts from the actuating device 100 and consequently therefore the actuating part 110 on the spring arrangement is among other things affected by the inclination of the gliding surfaces 168, 169.

A depth T of a locking indentation 164 is equal relative to the vertices 166, 167 regardless of an actuation about the actuating pivot axis BS or along the actuating longitudinal axis BL but not a pivot point pathway SD relative to a pivoting of the actuating part 110 about the actuating pivot axis BS or linear setting length SL of the actuating part 110 in the event of a linear adjustment along the actuating longitudinal axis BL.

The setting length SL corresponds to the distance between the lowest point in the locking indentation 164 and the vertex 170 which runs transverse to the actuating longitudinal axis BL.

The pivot point pathway SD corresponds to the distance between the vertex 166 which runs in parallel to the actuating pivot axis BS and the lowest point of a respective locking indentation 264.

The pivot point pathways SD is shorter than the setting length SL resulting in an incline WD relative to a rotational movement about the actuating pivot axis BS as an incline WL which shifts the gliding surfaces 169 in response to an actuation of the locking structure 180 or the actuating part 110 on which the locking structure is arranged in the direction of the actuating longitudinal axis BL.

In practice, it has been shown that for example a slope or an incline of a gliding surface for a linear adjustment movement, for example the incline WL should be at least 20 degrees, preferably at least 25 degrees, more preferably 30 degrees. A rotational actuation of the locking structure 180 relative to the locking part 161 can be associated with a lower incline in the assigned gliding surface. For example in the incline WD a slope of at least 10 degrees, preferably at least 15 degrees or 20 degrees is advantageous. Of course larger inclinations of slopes can also be provided in the inclines WD or WL.

The design or the spring deflection of the locking part 161 has for example a further influence on optimal locking or control in the direction of the respective actuating positions B1-B4. If the locking part has a longer spring deflection, in other words the respective setting length of the locking part is greater, steep gliding surfaces or gliding surfaces with a steeper incline can for example be achieved. The setting pathways of the locking part must be sufficient to adjust the locking part into the respective locking indentation, so for example must have the depth T as a minimum. In order to enlarge the setting pathways of the locking part 161, this can be supported in the machine house 111 at a greater distance from the locking structure 180. A measure of this kind is indicated in FIG. 19. In the arrangement according to FIG. 5, the locking part 161 is supported on the circumferential wall 45 of the gearbox housing 44. A modified gearbox housing 44B of a gearbox 40B, which otherwise corresponds to the gearbox 40, can for example have a cover 46B on which a recess 1636 for the locking part 161 or the spring 162 is provided. The inner circumference of the gearbox housing 44B is then fully retained to receive for example the hollow wheels 61, 62 although the recess 1636 is more likely to be closer to the rotational axis of the hollow wheels 61, 62 than the recess 163.

Figures 3, 23:
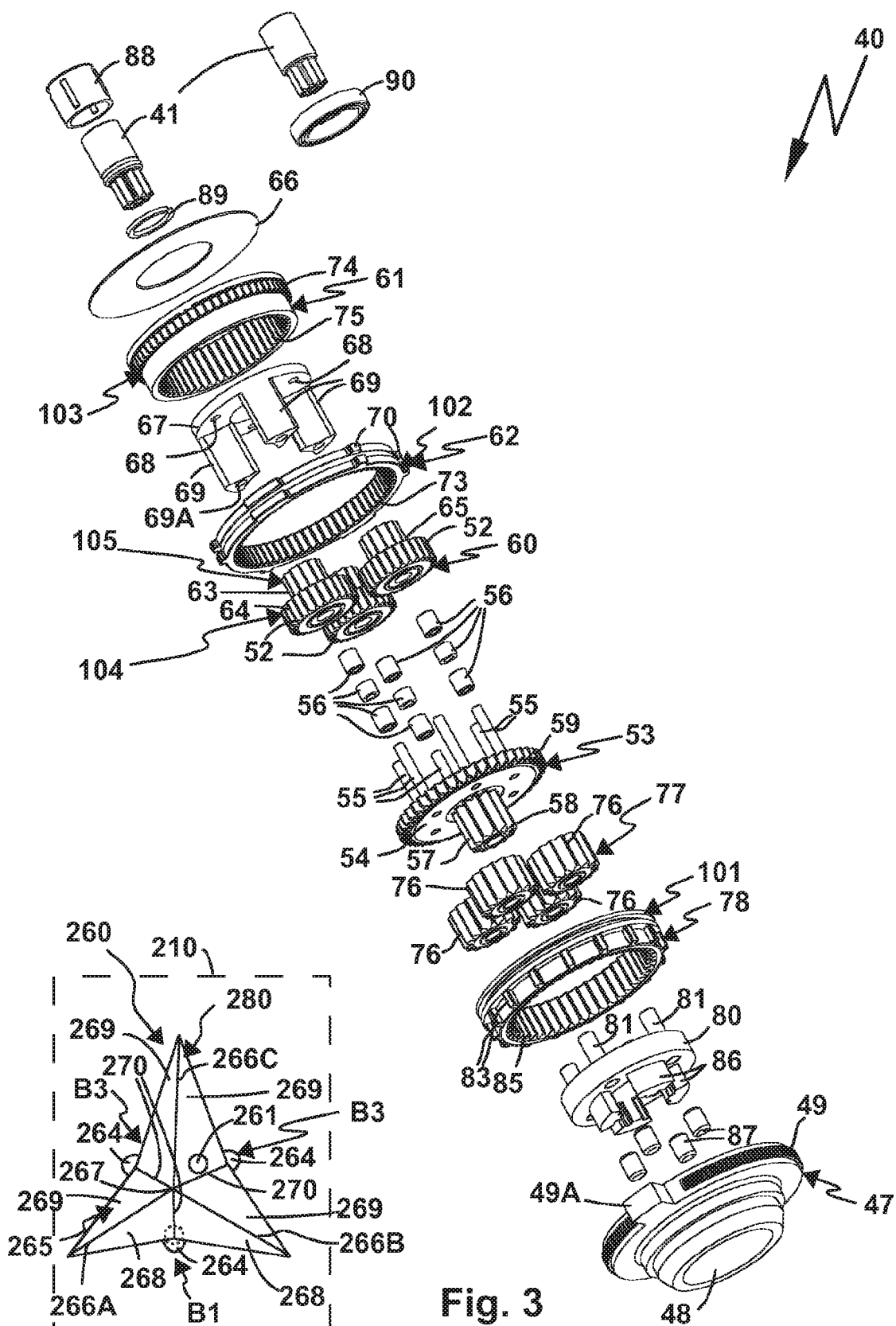
FIG. 3 is an exploded diagram of a gearbox of the manual machine tool according to the above figures.
FIG. 23 is a locking arrangement with a control surface arrangement assigned to three locking indentations in a frontal view from the front or above.

In a locking arrangement 260 according to FIG. 23, a bolt-like locking part in the manner of the locking part 161, a ball or the like is provided as a locking part 261 to engage in locking indentations 264 of a locking structure 280. The locking indentations 264 are for example assigned to actuating positions B1, B2 and B3, which is advantageous in a three-speed gearbox. The locking indentations 264 are arranged at corner points of a triangle. Gliding surfaces 268, 269 run from a respective locking indentation 264 to vertices 266A, 266B, 266C. The vertices 266A, 266B, 266C run in a star shape to a vertex point 267. If the locking part 261 lies on the vertex point 267 or one of the vertices 266A, 266B, 266C, it takes on an unstable position such that it is deflected along the gliding surfaces 268, 269 in the direction of one of the locking indentations 264. A pair of gliding surfaces 268 or 269 has gliding surfaces 268, 269 which face one another, between which a depression 270 is formed. Each depression or channel 270 runs to one of the locking indentations 264.

It is possible for example for the locking part 261, in particular a sprung sphere, to be arranged on the actuating part 110 while the locking structure 180 including the control surface arrangement 165 can be arranged on the outer circumference of the gearbox housing 44. Of course the reverse configuration is also possible, in other words that the locking part 261 is supported on the machine housing 11, for example the gearbox housing 44 or the cover 46B of this while the locking structure 280 is arranged on an actuating part 210 (shown with a dashed line in FIG. 23). The actuating part 210 is for example mounted on the machine housing 11 in a manner which permits sliding and/or a manner which permits pivoting in order to adjust the three-speed gearbox that is not shown in the drawing between its setting positions or three gears.

The invention claimed is:

1. A manual machine tool having a drive motor, a gearbox and a tool holder, wherein a motor drive of the drive motor with a gearbox drive of the gearbox and a gearbox output of the gearbox which can be rotated about a rotational axis is coupled to the tool holder in a manner which permits rotation, wherein the manual machine tool has an actuating device to adjust the gearbox between its switch positions in which the speed ratios between the gearbox drive and the gearbox output are different, wherein the actuating device has an actuating part which is movably mounted relative to a machine housing of the manual machine tool between actuating positions assigned to the switch positions of the gearbox and which can be manually actuated by an operator of the manual machine tool, which is coupled to the at least one switching gear element by means of a coupling element to set the switch positions, and wherein the actuating device used to lock the actuating part in the actuating positions has a locking arrangement with locking indentations arranged on a locking structure which are assigned to actuating positions of the actuating part and with a locking part to engage in the locking indentations, and wherein the locking structure has a control surface arrangement with gliding surfaces along which the locking part can glide and which extend starting from at last two locking indentations to a vertex which is arranged between the locking indentations and protrudes in front of the locking indentations, wherein the locking part has an unstable position on the vertex such that the locking part is guided past the vertex into one of the locking indentations adjacent to the vertex.

2. The manual machine tool according to claim 1, wherein the vertex is straight or curved in full or in sections.

3. The manual machine tool according to claim 1, wherein the locking structure has at least three or four locking indentations, between which a vertex is arranged in each case, on which vertex the locking part has an unstable position and from which vertex a gliding surface extends out to the respective locking indentation in each case.

4. The manualManual machine tool according to claim 3, wherein the vertices run in a star shape and/or cross one another.

5. The manual machine tool according to either claim 3, wherein the locking indentations are at equal angular distances from one another and/or are arranged in corner areas of an in equal-sided polygon.

6. The manual machine tool according to claim 1, wherein at least one of the locking indentations is assigned to gliding surfaces which face one another, between which a channel or a depression is formed which extends from the locking indentation to the vertex.

7. The manualManual machine tool according to claim 1, wherein exactly one single vertex is present between two adjacent locking indentations.

8. The manual machine tool according to claim 1, wherein at least one of the gliding surfaces has a sloped surface and/or a surface which is convex relative to the locking part.

9. The manual machine tool according to claim 1, wherein both gliding surfaces adjacent to the vertex are at an angle and/or have an incline in the direction of the locking indentations.

10. The manual machine tool according to claim 1, wherein at least one of the gliding surfaces has an incline of at least 12°, or at least 25° or 30° from the vertex to the locking indentation adjacent to the vertex.

11. The manual machine tool according to claim 1, wherein a gliding surface along which the locking part glides in the event of a relative movement of the locking structure and the locking part has a lower incline than a gliding surface along which the locking part glides in the event of a linear adjustment of the locking structure and the locking part relative to one another.

12. The manual machine tool according to claim 1, wherein the locking part has a convex curved and/or spherical gliding surface to glide along the locking structure.

13. The manual machine tool according to claim 1, wherein the locking part has a gliding surface with a gliding coating to glide along the locking structure.

14. The manual machine tool according to claim 1, wherein the locking part is spring loaded by means of at least one spring into a locking position which engages in the locking indentations.

15. The manual machine tool according to claim 14, whereinc the locking part is deflected by the spring loading from the unstable position on the vertex into one of the locking indentations adjacent to the vertex.

16. The manual machine tool according to claim 1, wherein at least one spring arrangement is arranged between the actuating part and the at least one switching gear element.

17. The manual machine tool according to claim 16, wherein the spring arrangement between the switching gear element and the actuating part is provided by the coupling element.

18. The manual machine tool according to claim 1, wherein the coupling element is or comprises a spring element and/or whereinin the coupling element is a spring bow or comprises a spring bow, wherein the spring bow is extended in a ring-shaped manner about the at least one switching gear element.

19. The manual machine tool according to claim 1, wherein the actuating part is pivotably mounted about an actuating pivot axis relative to the machine housing of the manual machine tool and/or is displaceably mounted about a linear actuating longitudinal axis.

20. The manual machine tool according to claim 1, wherein a deflecting gear is arranged between the actuating part and the at least one switching gear element to deflect a pivot movement of the actuating part into a linear movement of the at least one switching gear element or to deflect a linear movement of the actuating part into a pivot movement of the at least one switching gear element.

21. The manual machine tool according to claim 1, wherein the actuating part has an arch-shaped or barrel-shaped wall design and/or wherein the locking structure is arranged on the actuating part.

22. The manual machine tool according to claim 1, wherein a gliding coating is provided on the at least one vertex and/or on at least one gliding surface and/or the locking structure has a smaller friction coefficient on the vertex and/or on at least on gliding surface than in the region of at least one of the at least two locking indentations.

23. The manual machine tool according to claim 1, wherein the switching gear element comprises a first switching gear element and at least a second switching gear element which can be adjusted in a linear manner in each case by means of the actuating device between a first setting position and a second setting position relative to a gearbox housing, wherein the first switching gear element can be adjusted in a linear manner by the deflecting gear along its pivot axis by means of a pivot movement of the actuating part about the actuating pivot axis.

24. The manual machine tool according to claim 23, wherein the deflecting gear comprises a carrier ring which extends in a ring-shaped manner around the gearbox housing and is rotatably mounted about the actuating pivot axis, which carrier ring is coupled to the first switching gear element by means of a first coupling element to carry out the linear adjustment of the switching gear element, and in that the actuating part is mounted in a manner which permits the linear displacement on the carrier ring along the actuating longitudinal axis and is coupled to the at least one second switching gear element by means of a second coupling element to enable the linear displacement of the second switching gear element.

\* \* \* \* \*

UNITED STATES PATENT AND TRADEMARK OFFICE
CERTIFICATE OF CORRECTION

PATENT NO. : 11,325,239 B2
APPLICATION NO. : 16/642271
DATED : May 10, 2022
INVENTOR(S) : Philipp Huggenberger It is certified that error appears in the above-identified patent and that said Letters Patent is hereby corrected as shown below:

In the Claims

| | |
|---|---|
| Column 28, Line 35, in Claim 4, and Line 47, in Claim 7: | now reads "The manualManual machine tool" should read --The manual machine tool-- |
| Column 28, Line 38, in Claim 5: | now reads "to either claim 3" should read --to claim 3-- |
| Column 28, Line 41, in Claim 5: | now reads "of an in equal-sided" should read --of an equal-sided-- |
| Column 29, Line 12, in Claim 15: | now reads "claim 14, whereinc" should read --claim 14, wherein-- |
| Column 29, Line 25, in Claim 18: | now reads "and/or whereinin" should read --and/or wherein-- |

Signed and Sealed this
Fifteenth Day of November, 2022

Katherine Kelly Vidal
*Director of the United States Patent and Trademark Office*